(12) United States Patent
Gonzalez et al.

(10) Patent No.: US 10,900,520 B1
(45) Date of Patent: Jan. 26, 2021

(54) BEARING ASSEMBLIES INCLUDING INTEGRATED LUBRICATION, BEARING APPARATUSES, AND METHODS OF USE

(71) Applicant: US SYNTHETIC CORPORATION, Orem, UT (US)

(72) Inventors: Jair J. Gonzalez, Provo, UT (US); Craig H. Cooley, Saratoga Springs, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 16/263,694

(22) Filed: Jan. 31, 2019

Related U.S. Application Data

(63) Continuation of application No. 15/356,994, filed on Nov. 21, 2016, now Pat. No. 10,233,971, which is a
(Continued)

(51) Int. Cl.
| | | |
|---|---|---|
| *F16C 17/02* | (2006.01) | |
| *F16C 17/04* | (2006.01) | |
| *F16C 33/04* | (2006.01) | |
| *F16C 33/10* | (2006.01) | |
| *F16C 33/66* | (2006.01) | |

(Continued)

(52) U.S. Cl.
CPC ......... *F16C 33/1095* (2013.01); *E21B 4/003* (2013.01); *E21B 10/22* (2013.01); *F16C 17/02* (2013.01); *F16C 17/04* (2013.01); *F16C 33/043* (2013.01); *F16C 33/108* (2013.01); *F16C 2202/04* (2013.01); *F16C 2206/04* (2013.01); *F16C 2352/00* (2013.01)

(58) Field of Classification Search
CPC ........ F16C 17/02; F16C 17/04; F16C 33/105; F16C 33/043; F16C 33/108; F16C 33/24; F16C 33/1095; F16C 2202/04; F16C 2206/04; F16C 2352/00; E21B 4/003; E21B 10/22
USPC ... 384/42, 93, 121, 282, 286, 289, 313, 317, 384/368, 420, 428, 123, 371, 907; 175/371, 434; 29/898.041, 898.1
See application file for complete search history.

(56) References Cited

U.S. PATENT DOCUMENTS 3,709,573 A * 1/1973 Orkin .................. F16C 17/10
384/264
4,337,985 A    7/1982 Gerling
(Continued)

FOREIGN PATENT DOCUMENTS

| FR | 1558297 | | 2/1969 | | |
|---|---|---|---|---|---|
| JP | 58081220 A | * | 5/1983 | ........... | C09D 179/08 |

OTHER PUBLICATIONS

U.S. Appl. No. 13/275,372, filed Oct. 18, 2011, Mukhopadhyay et al.
(Continued)

*Primary Examiner* — Marcus Charles
(74) *Attorney, Agent, or Firm* — Dorsey & Whitney LLP

(57) ABSTRACT

Embodiments disclosed herein are directed to bearing assemblies that include integrated lubrication, bearing apparatuses including such bearing assemblies, and related methods. For example, a lubricated bearing assembly may include a lubricant that may lubricate the bearing surface thereof during operation of the lubricated bearing assembly and/or bearing apparatus including the lubricated bearing assembly.

20 Claims, 11 Drawing Sheets

Related U.S. Application Data continuation of application No. 14/562,165, filed on Dec. 5, 2014, now Pat. No. 9,523,386.

(51) Int. Cl.
*E21B 10/22* (2006.01)
*E21B 4/00* (2006.01)

(56) References Cited

U.S. PATENT DOCUMENTS

| | | | |
|---|---|---|---|
| 4,468,138 A | 8/1984 | Nagel | |
| 4,720,199 A | 1/1988 | Geczy et al. | |
| 4,789,251 A | 12/1988 | McPherson et al. | |
| 5,092,687 A | 3/1992 | Hall | |
| 5,137,374 A * | 8/1992 | Orkin | F16C 13/006 384/297 |
| 5,253,939 A | 10/1993 | Hall | |
| 5,342,129 A | 8/1994 | Dennis et al. | |
| 5,398,294 A * | 3/1995 | Narkon | F16C 13/006 384/280 |
| 5,693,994 A | 12/1997 | New | |
| 5,707,718 A | 1/1998 | Matsukawa et al. | |
| 5,743,654 A | 4/1998 | Ide et al. | |
| 6,190,050 B1 | 2/2001 | Campbell | |
| 6,460,635 B1 * | 10/2002 | Kalsi | E21B 10/22 175/229 |
| 6,746,152 B2 | 6/2004 | Branagan | |
| 7,255,480 B2 | 8/2007 | John et al. | |
| 7,533,740 B2 | 5/2009 | Zhang et al. | |
| 7,845,875 B2 * | 12/2010 | Julliere | F16C 33/1095 403/135 |
| 7,866,418 B2 | 1/2011 | Bertagnolli et al. | |
| 7,971,663 B1 | 7/2011 | Vail | |
| 7,998,573 B2 | 8/2011 | Qian et al. | |
| 8,034,136 B2 | 10/2011 | Sani | |
| 8,236,074 B1 | 8/2012 | Bertagnolli et al. | |
| 8,480,304 B1 | 7/2013 | Cooley et al. | |
| 8,561,727 B1 | 10/2013 | Pope et al. | |
| 8,807,837 B1 | 8/2014 | Gonzalez et al. | |
| 8,814,434 B1 | 8/2014 | Sexton | |
| 9,200,488 B2 * | 12/2015 | Kirkhope | F16C 21/00 |
| 9,309,923 B1 | 4/2016 | Lingwall et al. | |
| 9,523,386 B1 | 12/2016 | Gonzalez et al. | |
| 9,644,676 B1 | 5/2017 | Lingwall et al. | |
| 9,790,992 B1 | 10/2017 | Lingwall et al. | |
| 2006/0171616 A1 | 8/2006 | Richie et al. | |
| 2006/0288579 A1 | 12/2006 | Luo et al. | |
| 2007/0131459 A1 | 6/2007 | Voronin et al. | |
| 2009/0097788 A1 | 4/2009 | Cooley et al. | |
| 2010/0218995 A1 | 9/2010 | Sexton et al. | |
| 2011/0174544 A1 | 7/2011 | Scott et al. | |
| 2012/0039551 A1 | 2/2012 | Cooley et al. | |
| 2012/0225253 A1 | 9/2012 | DiGiovanni et al. | |
| 2012/0225277 A1 | 9/2012 | Scott | |
| 2013/0044971 A1 | 2/2013 | Cooley et al. | |
| 2014/0023301 A1 | 1/2014 | Sexton et al. | |
| 2014/0241654 A1 | 8/2014 | Cooley et al. | |
| 2014/0252843 A1 | 9/2014 | Cox | |

OTHER PUBLICATIONS

U.S. Appl. No. 13/027,954, filed Feb. 15, 2011, Miess et al.
U.S. Appl. No. 13/100,388, filed May 4, 2011, Jones et al.
U.S. Appl. No. 14/562,165, filed Dec. 5, 2014, Gonzalez et al.
U.S. Appl. No. 14/462,275, filed Dec. 5, 2014, Lingwall et al.
U.S. Appl. No. 15/073,461, filed Mar. 17, 2016, Lingwall et al.
U.S. Appl. No. 15/356,994, filed Nov. 21, 2016, Gonzalez et al.
U.S. Appl. No. 15/492,301, filed Apr. 20, 2017, Lingwall et al.
Erdemir, "Solid Lubricants and Self-Lubricating Films", Modern Tribology Handbook, Chapter 22, 18 pages, (2001).
Henze, "Dry Lubrication" http://www.henze-bnp.de/html/eng/boron_nitride/properties/dry_lubricating_properties.php. Accessed Apr. 30, 2014.
Henze, "Technical Bornon Nitride Applications—Overview" http//www.henze-bnp.de/html/eng/boron_nitride_products/boron_nitride_applications.php Access Apr. 30, 2014.
U.S. Appl. No. 14/562,275, Dec. 4, 2015, Notice of Allowance.
U.S. Appl. No. 14/562,275, Mar. 23, 2016, Issue Notification.
U.S. Appl. No. 14/562,165, Apr. 15, 2016, Office Action.
U.S. Appl. No. 14/562,165, Aug. 12, 2016, Notice of Allowance.
U.S. Appl. No. 14/562,165, Dec. 20, 2016, Issue Notification.
U.S. Appl. No. 15/073,461, May 25, 2016, Notice of Allowance.
U.S. Appl. No. 15/073,461, Aug. 24, 2016, Office Action.
U.S. Appl. No. 15/073,461, Apr. 19, 2017, Issue Notification.
U.S. Appl. No. 15/492,301, Jun. 15, 2017, Notice of Allowance.
U.S. Appl. No. 15/492,301, Sep. 27, 2017, Issue Notification.
U.S. Appl. No. 15/356,994, Feb. 22, 2018, Restriction Requirement.
U.S. Appl. No. 15/356,994, Jun. 18, 2018, Office Action.
U.S. Appl. No. 15/356,994, Nov. 2, 2018, Notice of Allowance.
U.S. Appl. No. 15/356,994, Feb. 27, 2019, Issue Notification.

* cited by examiner

BEARING ASSEMBLIES INCLUDING INTEGRATED LUBRICATION, BEARING APPARATUSES, AND METHODS OF USE

CROSS-REFERENCE TO RELATED APPLICATIONS

This application is a continuation of U.S. application Ser. No. 15/536,994 filed 21 Nov. 2016 (now U.S. Pat. No. 10,233,971), which is a continuation of U.S. application Ser. No. 14/562,165 filed on 5 Dec. 2014 (now U.S. Pat. No. 9,523,386), the disclosure of each of the foregoing applications is incorporated herein, in its entirety, by this reference.

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. Bearing apparatuses (e.g., thrust, radial, tapered, and other types of bearings) also may be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

A typical bearing apparatus includes a stator that does not rotate and a rotor that is attached to the output shaft and rotates with the output shaft. The stator and rotor each includes a plurality of bearing elements, which may be fabricated from polycrystalline diamond compacts ("PDCs") that provide diamond bearing surfaces that bear against each other during use.

The operational lifetime of the bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Embodiments disclosed herein are directed to bearing assemblies that include integrated lubrication, bearing apparatuses including such bearing assemblies, and related methods. For example, a lubricated bearing assembly may include a lubricant that may lubricate bearing surfaces thereof during operation of the lubricated bearing assembly and/or bearing apparatus including the lubricated bearing assembly. Additionally or alternatively, the lubricant included in the lubricated bearing assembly may cool one or more elements or components of the lubricated bearing assembly during operation.

At least one embodiment includes a superhard bearing element that includes a substrate and a superhard table bonded to the substrate. The superhard table includes a superhard bearing surface, and a recess extending from the superhard bearing surface toward the substrate. The superhard bearing element also includes a lubricant body located at least partially within the recess and having an exposed lubrication surface.

At least one embodiment includes a bearing assembly that includes a support ring and a plurality of superhard bearing elements secured to the support ring. Each of the plurality of superhard bearing elements includes a superhard bearing surface. The bearing assembly further includes one or more lubricant bodies each of which includes a lubrication surface that lies approximately on the same imaginary surface as the superhard bearing surfaces.

Furthermore, embodiments include a bearing apparatus that includes a first bearing assembly and a second bearing assembly. The first bearing assembly includes one or more first bearing surfaces. The second bearing assembly includes a plurality of superhard bearing surfaces positioned to engaged with the first bearing surfaces. Moreover, the second bearing assembly includes one or more lubrication surfaces that are approximately coplanar with the plurality of superhard bearing surfaces.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments, wherein identical reference numerals refer to identical or similar elements or features in different views or embodiments shown in the drawings.

DETAILED DESCRIPTION

Embodiments disclosed herein are directed to bearing elements and bearing assemblies that include integrated lubrication as well as bearing apparatuses including such bearing assemblies, and related methods. For example, a lubricated bearing assembly may include a lubricant that may lubricate bearing surfaces thereof during operation of the lubricated bearing assembly and/or bearing apparatus including the lubricated bearing assembly. Additionally or alternatively, a lubricant body included in the lubricated bearing assembly may cool and/or lubricate one or more elements or components of the lubricated bearing assembly during operation.

In some embodiments, the lubricant body may be included or contained in one or more bearing elements of the lubricated bearing assembly. In alternative or additional embodiments, the lubricant body may be included in or mounted to a support ring of the lubricated bearing assembly. For example, wear at the bearing surfaces of the bearing assembly may expose new lubricant in the lubricant body to the bearing surfaces of the lubricated bearing assembly and/or to an opposing bearing surface (e.g., of an opposing bearing assembly). In any event, in an embodiment, the lubricant may be exposed and/or provided to one or more bearing surfaces during operation of the lubricated bearing assembly.

Figure 1:
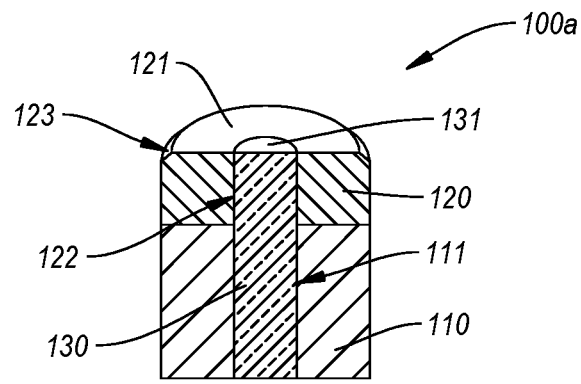
FIG. 1 is an isometric cutaway view of a superhard bearing element according to an embodiment.

FIG. 1 illustrates a lubricated superhard bearing element 100, which may be included in a bearing assembly according to one or more embodiments disclosed herein. The superhard bearing element 100 may include a substrate 110 and a superhard table 120 bonded to the substrate 110. For example, the superhard table 120 may include a superhard bearing surface 121. In some embodiments, the superhard bearing surface 121 may be approximately or substantially planar. However, in other embodiments, the bearing surface may be non-planar, such as cylindrically convex, cylindrically concave, semi-spherically convex, semi-spherically concave, etc.

In an embodiment, the superhard bearing element 100 includes a lubricant body 130. The lubricant body 130 may be at least partially located within the superhard bearing element 100. Hence, in an embodiment, the superhard bearing element 100 may include an opening that may house and secure the lubricant body 130 therein. For example, the opening in the superhard bearing element 100 may extend between the superhard bearing surface 121 and a back or mounting surface thereof. In other words, the superhard table 120 may include an opening 122 that may extend to and align with an opening 111 in the substrate 110, forming a through hole or opening in the superhard bearing element 100 in which the lubricant body 130 is disposed.

At least a portion of the lubricant body 130 may be exposed at or near the superhard bearing surface 121 of the superhard table 120. For example, the lubricant body 130 may include a lubrication surface 131 (e.g., which may be substantially coplanar with the superhard bearing surface 121). Accordingly, opposing bearing surface(s) of, for example, another bearing assembly that may contact the superhard bearing surface 121 may also contact the lubrication surface 131 during operation of a bearing assembly that includes the superhard bearing element 100.

Generally, the lubricant body 130 may include any suitable lubricant or combination of multiple lubricants. In some embodiments, the lubricant body 130 may be a dry/solid lubricant, such as graphite, hexagonal boron nitride ("HBN"), molybdenum disulfide, tungsten disulfide, combinations of the foregoing, or another suitable lubricant. Moreover, in some embodiments, the lubricant body 130 may be substantially uniform or monolithic and may have the same or similar size and/or shape as the opening in the superhard bearing element 100 (e.g., as the opening 122 in the superhard table 120). Additionally or alternatively, the lubricant body 130 may include multiple particles positioned inside the openings 111, 122 in the superhard bearing element 100 (e.g., at least a portion of the lubricant body 130 may be in a powder form). In an embodiment, the particles of the lubricant body 130 may be substantially loosely placed together within the opening in the superhard bearing and/or bonded element 100. In some embodiments, the particles of the lubricant body 130 may be compressed and/or bonded together (e.g., within the opening of the superhard bearing element 100). In some embodiments, the lubricant body 130 may be preformed (e.g., a solid cylinder of HBN or graphite) that may be positioned in the openings 111, 122 such as being tightly or loosely press-fit or brazed therein to the superhard table 120 and/or the substrate 110.

In some embodiments, the lubricant body 130 may include a semisolid lubricant such as grease. Suitable examples of grease include silicone-based grease, petroleum-based grease, combinations thereof, or another suitable grease. Moreover, in some embodiments, the lubricant body 130 may include any number of combinations of dry lubricant, solid lubricant, and semisolid lubricant.

In any event, in one or more embodiments, at least some of the lubricant body 130 (e.g., at the lubrication surface 131) may be removed or withdrawn. Specifically, in some embodiments, at least some of the lubricant body 130 may be relocated to at least a portion of the superhard bearing surface 121 of the superhard bearing element 100. For example, friction between the lubricant body 130 (e.g., at the lubrication surface 131) and an opposing bearing surface may remove some of the lubricant body 130 and position and/or distribute the removed lubricant on at least a portion of the superhard bearing surface 121 of the superhard bearing element 100. In other embodiments, erosion of the lubricant body 130 may distribute the lubricant on at least a portion of the superhard bearing surface 121 of the superhard bearing element 100.

In an embodiment, as the superhard table 120 wears (e.g., as the superhard table 120 wears and thickness thereof is reduced), portions of the lubricant body 130 may become exposed and may provide lubricant to at least a portion of the superhard bearing surface 121 and/or to at least a portion of the opposing bearing surface. In some embodiments, the lubrication surface 131 may remain approximately coplanar with the superhard bearing surface 121 during wear thereof. Similarly, if the bearing surface is non-planar, the lubrication surface may follow the general shape of such bearing surface and may recede and provide lubrication as described above.

Furthermore, in an embodiment, at least some of the lubricant body 130 may be pulled, worn, or otherwise removed from of the opening in the superhard bearing element 100 and onto at least a portion of the superhard bearing surface 121 (e.g., some of the lubricant body 130 may adhere to the opposing bearing surface and such adhesion may pull at least some of the lubricant body 130 out of the opening in the superhard bearing element). In an embodiment, removing at least some of the lubricant body 130 out of the superhard bearing element 100 may be caused by erosion of the lubricant body 130 closer to the superhard bearing surface 121 (e.g., a renewed lubrication surface 131 may be formed near the superhard bearing surface 121 as the lubricant body 130 that remains in the superhard bearing element 100 is eroded during operation). That is, as some of the lubricant body 130 at the lubrication surface 131 is removed (e.g., during operation of the bearing assembly), some of the remaining lubricant body 130 at least partially recreates the lubrication surface 131. As such, in some embodiments, the lubricant body 130 may be continually removed from the opening in the superhard bearing element 100 until supply thereof is exhausted. Also, it should be appreciated that, in some embodiments, the lubricant body 130 may be replaced or refilled, as desired.

A peripheral shape of the superhard bearing element 100 and portions thereof (i.e., peripheral shapes of the substrate 110 and superhard table 120) may vary from one embodiment to the next. For example, the substrate 110 and superhard table 120 may have approximately cylindrical shapes as illustrated. However, any suitable shape for the superhard bearing element 100 may be used. Also, in some embodiments, the superhard table 120 may include a chamfer 123 extending between the superhard bearing surface 121 and the peripheral surface of the superhard table 120.

Also, location of the openings 111, 122 in the superhard bearing element 100 relative to the peripheral shape thereof may vary from one embodiment to the next. For example, the opening in the superhard bearing element 100 (e.g., the opening 111 and/or the opening 122) and the lubrication surface 131 may be approximately concentric with a cylindrically-shaped peripheral surface of the superhard bearing element 100. Alternatively, the openings 111, 122 in the superhard bearing element 100 and the corresponding lubrication surface 131 may be offset relative to the centerline of the superhard bearing element 100.

In an embodiment, the superhard table 120 may comprise polycrystalline diamond and the substrate may comprise cobalt-cemented tungsten carbide. Furthermore, in any of the embodiments disclosed herein, the polycrystalline diamond table may be leached to at least partially remove or substantially completely remove a metal-solvent catalyst (e.g., cobalt, iron, nickel, or alloys thereof) that was used to initially sinter precursor diamond particles to form the polycrystalline diamond. In another embodiment, an infiltrant used to re-infiltrate a preformed leached polycrystalline diamond table may be leached or otherwise have a metallic infiltrant removed to a selected depth from a working surface. Moreover, in any of the embodiments disclosed herein, the polycrystalline diamond may be un-leached and include a metal-solvent catalyst (e.g., cobalt, iron, nickel, or alloys thereof) that was used to initially sinter the precursor diamond particles that form the polycrystalline diamond and/or an infiltrant used to re-infiltrate a preformed leached polycrystalline diamond table. Examples of bearing elements, methods for fabricating the superhard bearing elements, and superhard materials and/or structures from which the superhard bearing elements may be made are disclosed in U.S. Pat. Nos. 7,866,418; 7,998,573; 8,034,136; and 8,236,074; the disclosure of each of the foregoing patents is incorporated herein, in its entirety, by this reference.

The diamond particles that may be used to fabricate the superhard table in a high-pressure/high-temperature process ("HPHT") may exhibit a larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger size (e.g., 70 µm, 60 µm, 50 µm, 40 µm, 30 µm, 20 µm, 15 µm, 12 µm, 10 µm, 8 µm) and another portion exhibiting at least one relatively smaller size (e.g., 15 µm, 12 µm, 10 µm, 8 µm, 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger size between about 10 µm and about 40 µm and another portion exhibiting a relatively smaller size between about 1 µm and 4 µm. In another embodiment, the diamond particles may include a portion exhibiting the relatively larger size between about 15 µm and about 50 µm and another portion exhibiting the relatively smaller size between about 5 µm and about 15 µm. In another embodiment, the relatively larger size diamond particles may have a ratio to the relatively smaller size diamond particles of at least 1.5. In some embodiments, the diamond particles may comprise three or more different sizes (e.g., one relatively larger size and two or more relatively smaller sizes), without limitation. The resulting polycrystalline diamond formed from HPHT sintering the aforementioned diamond particles may also exhibit the same or similar diamond grain size distributions and/or sizes as the aforementioned diamond particle distributions and particle sizes. Additionally, in any of the embodiments disclosed herein, the superhard cutting elements may be freestanding (e.g., substrateless) and/or formed from a polycrystalline diamond body that is at least partially or fully leached to remove a metal-solvent catalyst initially used to sinter the polycrystalline diamond body.

As noted above, the superhard table 120 may be bonded to the substrate 110. For example, the superhard table 120 comprising polycrystalline diamond may be at least partially leached and bonded to the substrate 110 with an infiltrant exhibiting a selected viscosity, as described in U.S. patent application Ser. No. 13/275,372, entitled "Polycrystalline Diamond Compacts, Related Products, And Methods Of Manufacture," the entire disclosure of which is incorporated herein by this reference. In an embodiment, an at least partially leached polycrystalline diamond table may be fabricated by subjecting a plurality of diamond particles (e.g., diamond particles having an average particle size between 0.5 µm to about 150 µm) to an HPHT sintering process in the presence of a catalyst (e.g., from a substrate), such as cobalt, nickel, iron, or an alloy of any of the preceding metals to facilitate intergrowth between the diamond particles and form a polycrystalline diamond table comprising bonded diamond grains defining interstitial regions having the catalyst disposed within at least a portion of the interstitial regions. The as-sintered polycrystalline diamond table may be leached (e.g., after removal from substrate) by immersion in an acid or subjected to another suitable process to remove at least a portion of the catalyst from the interstitial regions of the polycrystalline diamond table, as described above. The at least partially leached polycrystalline diamond table includes a plurality of interstitial regions that were previously occupied by a catalyst and form a network of at least partially interconnected pores.

In an embodiment, the sintered diamond grains of the at least partially leached polycrystalline diamond table may exhibit an average grain size of about 20 µm or less. Subsequent to leaching the polycrystalline diamond table, the at least partially leached polycrystalline diamond table may be bonded to a substrate in an HPHT process via an infiltrant with a selected viscosity. For example, an infiltrant may be selected that exhibits a viscosity that is less than a viscosity typically exhibited by a cobalt cementing constituent of typical cobalt-cemented tungsten carbide substrates (e.g., 8% cobalt-cemented tungsten carbide to 13% cobalt-cemented tungsten carbide).

Additionally or alternatively, the superhard table 120 may be a polycrystalline diamond table that has a thermally-stable region, having at least one low-carbon-solubility material disposed interstitially between bonded diamond grains thereof, as further described in U.S. patent application Ser. No. 13/027,954, entitled "Polycrystalline Diamond Compact Including A Polycrystalline Diamond Table With A Thermally-Stable Region Having At Least One Low-Carbon-Solubility Material And Applications Therefor," the entire disclosure of which is incorporated herein by this reference. The low-carbon-solubility material may exhibit a melting temperature of about 1300° C. or less and a bulk modulus at 20° C. of less than about 150 GPa. The low-carbon-solubility, in combination with the high diamond-to-diamond bond density of the diamond grains, may enable the low-carbon-solubility material to be extruded between the diamond grains and out of the polycrystalline diamond table before causing the polycrystalline diamond table to fail during operations due to interstitial-stress-related fracture.

In some embodiments, the polycrystalline diamond, which may form the superhard table 120, may include bonded-together diamond grains having aluminum carbide disposed interstitially between the bonded-together diamond grains, as further described in U.S. patent application Ser. No. 13/100,388, entitled "Polycrystalline Diamond Compact Including A Polycrystalline Diamond Table Containing Aluminum Carbide Therein And Applications Therefor," the entire disclosure of which is incorporated herein by this reference.

Figure 2:
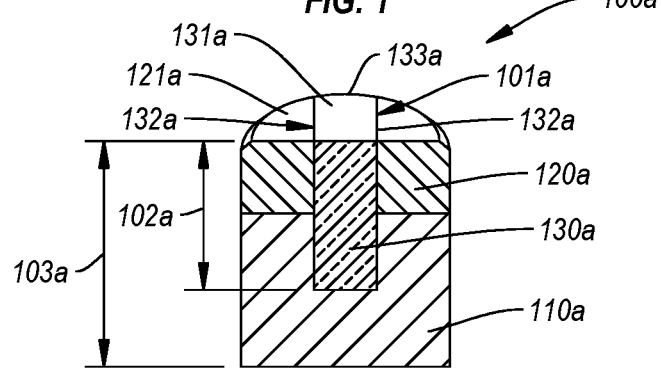
FIG. 2 is an isometric cutaway view of a superhard bearing element according to another embodiment.

Generally, the opening for the lubricant body and/or the lubrication surface may have any suitable shape, which may vary from one embodiment to the next. FIG. 2 illustrates a superhard bearing element 100a that includes an approximately rectangular opening 101a and an approximately rectangular lubrication surface 131a, according to an embodiment. In some embodiments, the opening 101a may be a slot that may at least partially pass through a side surface of the superhard bearing element 100a (e.g., the opening 101a may extend through the peripheral surface of the superhard bearing element 100a). Except as otherwise described herein, the superhard bearing element 100a and its materials, elements, components, or features may be similar to or the same as the superhard bearing element 100 (FIG. 1) and its corresponding materials, elements, components, and features. For example, the superhard bearing element 100a may include a superhard table 120a bonded to a substrate 110a, which may be similar to the respective superhard table 120 and substrate 110 of the superhard bearing element 100 (FIG. 1).

As mentioned above, in an embodiment, the lubrication surface 131a of the lubricant body 130a may have an approximately rectangular shape that may include approximately straight major sides 132a and curved minor sides 133a (e.g., the minor sides may be defined by an imaginary cylindrical surface that coincides with the peripheral surface of the superhard bearing element 100a). The lubricant body 130a may include material similar to or the same as the lubricant body 130 (FIG. 1). Hence, in an embodiment, the lubricant body 130a may be removed from the lubrication surface 131a during operation in the same manner as described above.

Moreover, in some embodiments, the opening 101a may not pass completely through a height of the superhard bearing element 100a. For example, the opening 101a may have a depth 102a (e.g., measured from superhard bearing surface 121a of the superhard table 120) that may be less than a height 103a of the superhard bearing element 100a. Generally, the depth 102a may vary from one embodiment to the next. In an embodiment, the depth 102a may be greater than the height of the superhard table 120a (e.g., the lubricant body 130a may extend past the interface between the substrate 110a and the superhard table 120a). In some embodiments, the depth 102a of the lubricant body 130a may be less that the height of the superhard table 120a. For example, the depth 102a may be about 250 µm to about 6,000 µm, such as about 500 µm to about 3,500 µm, about 1,000 µm to about 4,000 µm, or about 1,500 µm to about 2,500 µm. Also, the general shape of the opening containing the lubricant body and/or the shape of the lubrication surface may vary from one embodiment to the next.

Figure 3:
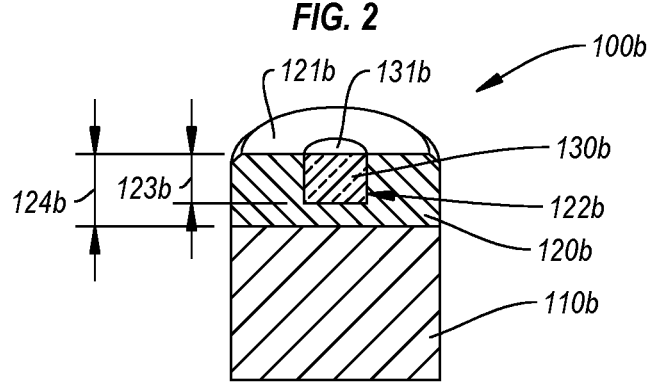
FIG. 3 is an isometric cutaway view of a superhard bearing element according to yet another embodiment.

As described above, for example, the opening may have an approximately circular cross-sectional shape. More specifically, FIG. 3 illustrates an embodiment that includes an approximately circular-shaped opening that contains a lubricant body 130b and does not pass through a superhard bearing element 100b. Except as otherwise described herein, the superhard bearing element 100b and its materials, elements, components, or features may be similar to or the same as any of the superhard bearing element 100, 100a (FIGS. 1, 2) and their corresponding materials, elements, components, and features. For example, the superhard bearing element 100b may include a superhard table 120b bonded to the substrate 110b, which may be similar or identical to the superhard table 120 and substrate 110 of the superhard bearing element 100 (FIG. 1).

The superhard table 120b may include an opening 122b in the lubricant body 130b may be secured and/or positioned. For example, the opening 122b may have a depth 123b that may be less than a height 124b of the superhard table 120b. In other words, in an embodiment, the lubricant body 130b may be entirely contained within the superhard table 120b, and may have an exposed lubrication surface 131b. For example, the depth 123b may be about 100 µm to about 1,000 µm, such as about 100 µm to about 500 µm, about 250 µm to about 400 µm, or about 150 µm to about 350 µm. Furthermore, in some embodiments, the lubrication surface 131b may be approximately coplanar with a superhard bearing surface 121b of the superhard bearing element 100b, as described above.

Figure 4:
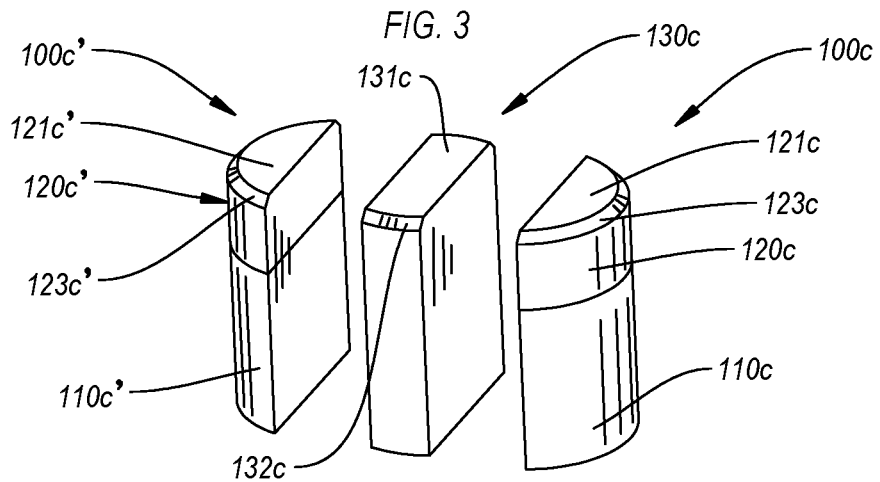
FIG. 4 is an exploded, isometric view of a superhard bearing element according to an embodiment.

In some embodiments, the lubricant body may not be entirely contained within a recess in the superhard bearing element. For example, lubricant body may be surrounded by one or more superhard bearing elements and/or portions thereof. For example, FIG. 4 illustrates superhard bearing element portions 100c, 100c' which may at least partially surround lubricant body 130c. Except as otherwise described herein, the superhard bearing elements 100c, 100c' and their respective materials, elements, components, or features may be similar to or the same as any of the superhard bearing elements 100, 100a, 100b (FIGS. 1-3) and their corresponding materials, elements, components, and features. For example, the superhard bearing element portions 100c, 100c' may include respective superhard tables 120c, 120c' bonded to corresponding substrates 110c, 110c' similar or identical to the superhard bearing element 100 (FIG. 1).

In an embodiment, the superhard bearing element portion 100c and the superhard bearing element portions 100c' may have approximately semi-cylindrical shapes. For example, the superhard bearing element portions 100c, 100c' may be shaped as partial cylinders. Moreover, in some examples, when assembled together, the superhard bearing element portions 100c, 100c' and lubricant body 130c may collectively form an approximately cylindrical shape.

As described above the lubricant body 130e may include a lubrication surface 131c. Furthermore, for example, similar to the superhard bearing element 100 (FIG. 1), the superhard tables 120c, 120c' may include corresponding chamfers 123c, 123c' (e.g., the chamfer 123c may extend between superhard bearing surface 121c and a portion of the peripheral surface of the superhard table 120c). Also, the lubricant body 130c may include chamfers 132c (not all labeled). In some embodiments, the chamfers 132c may be formed along opposing minor sides thereof.

More specifically, in some embodiments, the chamfers 132c may extend between the lubrication surface 131c and respective peripheral surfaces of the minor sides of the lubricant body 130c. In some examples, when the superhard bearing elements 100c, 100c' and lubricant body 130c are assembled or placed together, such as to collectively form a cylinder, the chamfers 123c, 123c', and 132c may align with one another and/or collectively form a chamfer that surrounds the superhard bearing surfaces 121c, 121c' and the lubrication surface 131c about the periphery thereof. In other words, the chamfer formed collectively by the chamfers 123c, 123c,' and 132c may extend between the superhard bearing surfaces 121e, 121c' and the lubrication surface 131c, and a peripheral surface of the cylinder formed by the superhard bearing element 100c, 100c' and the lubricant body 130e.

In an embodiment, the superhard bearing elements 100c, 100c' and the lubricant body 130c may be secured together within an opening of a bearing assembly (e.g., in an opening in a support ring, as described below in further detail). Additionally or alternatively, the lubricant body 130c may be secured or attached to the superhard bearing element 100c and/or to the superhard bearing element 100c'. For example, the lubricant body 130e may be secured or attached to the superhard bearing element 100c and/or superhard bearing element 100c' with an adhesive. In an embodiment, the superhard bearing elements 100c, 100c' and the lubricant body 130c may be assembled together (e.g., to form a cylinder or a single unit) before installation and/or mounting thereof on the support ring.

Figure 5A:
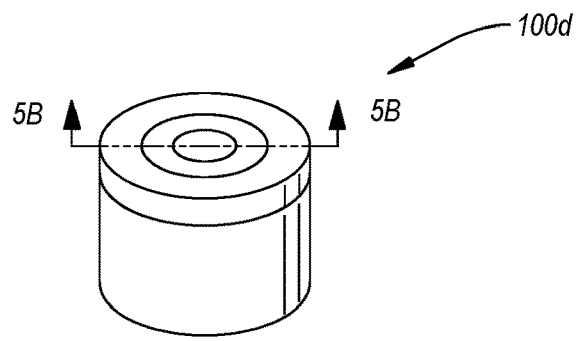
FIG. 5A is an isometric view of a superhard bearing element according to another embodiment.
Figure 5B:
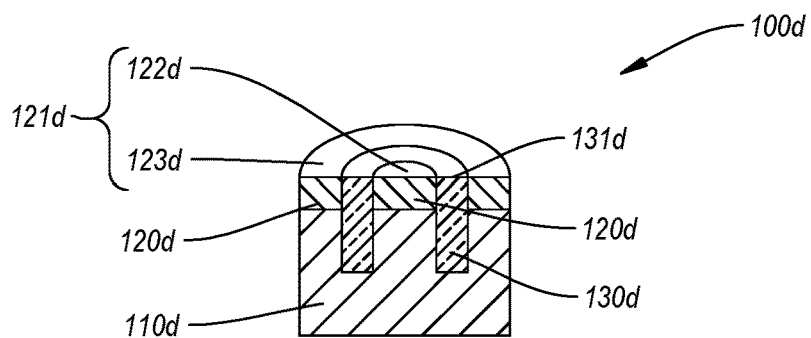
FIG. 5B is an isometric cutaway view of the superhard bearing element of FIG. 5A.

In some embodiments, the lubrication surface formed by the lubricant body may laterally enclose or laterally surround at least a portion of a superhard bearing surface. As shown in FIGS. 5A-5B, for example, a superhard bearing element 100d may include a lubricant body 130d (FIG. 5B) exhibiting an annular geometry. Optionally, lubricant body 130d may surround a portion of a bearing surface of the superhard bearing element 100d. As shown in FIG. 5B, the lubricant body 130d may include a lubrication surface 131d formed about an inner portion 122d of a superhard bearing surface 121d. Except as otherwise described herein, the superhard bearing element 100d and its materials, elements, components, or features may be similar to or the same as any of the superhard bearing elements 100, 100a, 100b, 100c, 100c' (FIGS. 1-4) and their corresponding materials, elements, components, and features. For example, the superhard bearing element 100d may include a superhard table 120d that may be bonded to substrate 110d, which may be similar to the superhard bearing element 100 (FIG. 1).

In an embodiment, the superhard bearing surface 121d may have an outer portion 123d and the inner portion 122d. In some embodiments, the outer portion 123d may surround at least a portion of the lubrication surface 131d. In some embodiments, the lubricant body 130d may have an approximately tubular or otherwise hollow shape. For example, the inner portion 122d of the bearing surface 121d may be located inside the opening of the hollow-shaped lubricant body 130. In other embodiments, lubricant body 130e may be cylindrical and bearing element 100e' may be omitted.

Figure 6:
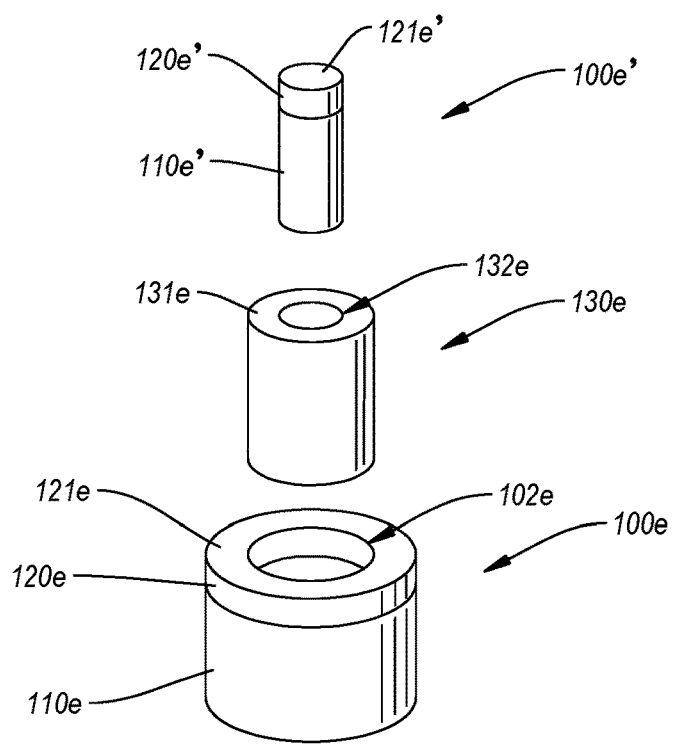
FIG. 6 is an exploded, isometric view of a superhard bearing element according to an embodiment.

Also, as described above, the lubricant body 130d may extend into the superhard bearing element 100d to any suitable depth. In an embodiment, the lubricant body 130d extends to a depth that is less than the height of the superhard bearing element 100d. More specifically, the lubricant body 130d may be contained within the superhard bearing element 100d. In some embodiments, as shown in FIG. 6, a superhard bearing element 100e may include a through opening 102e that may accept and/or house a lubricant body 130e. Furthermore, the lubricant body 130e may include an opening 132e that may optionally accept and/or house a superhard bearing element 100e'. In other words, the superhard bearing element 100e may at least partially surround the lubricant body 130e, and the lubricant body 130e may at least partially surround the superhard bearing element 100e'. The assembly of the lubricant body 130e, superhard bearing element 100e, and lubricant body 130e may be firmly or loosely press-fit together or brazed together. In other embodiments, lubricant body 130e may be cylindrical and bearing element 100e' may be omitted.

Except as otherwise described herein, the superhard bearing elements 100e, 100e' and their respective materials, elements, components, or features may be similar to or the same as any of the superhard bearing element 100, 100a, 100b, 100c, 100c', 100d (FIGS. 1-5) and their corresponding materials, elements, components, and features. For example, the superhard bearing element 100e, 100e' may include respective superhard table 120e, 120e' bonded to corresponding substrate 110e, 110e' similar to the superhard bearing element 100 (FIG. 1). Furthermore, the lubricant body 130e may include a lubrication surface 131e that may be surrounded by a superhard bearing surface 121e of the superhard table 120e. Additionally or alternatively, the superhard table 120e' may include a superhard bearing surface 121e' that may be at least partially surrounded by the lubrication surface 131e.

In some embodiments, the superhard bearing surfaces 121e, 121e' and the lubrication surface 131e may be substantially coplanar when assembled together. For example, the superhard bearing surface 121e, 121e' and the lubrication surface 131e may collectively form or define a planar surface. Alternatively, the superhard bearing surfaces 121e, 121e' and the lubrication surface 131e may collectively define or lie along a concave or convex surface.

Furthermore, in an embodiment, the lubricant body 130e may be removable and/or replaceable. For example, the lubricant body 130e may be replaced (e.g., after a predetermined amount thereof has been exhausted or removed). Accordingly, the lubricant body 130e may continue providing lubrication to the superhard bearing surface 121e, 121e' after replacement.

Figure 7:
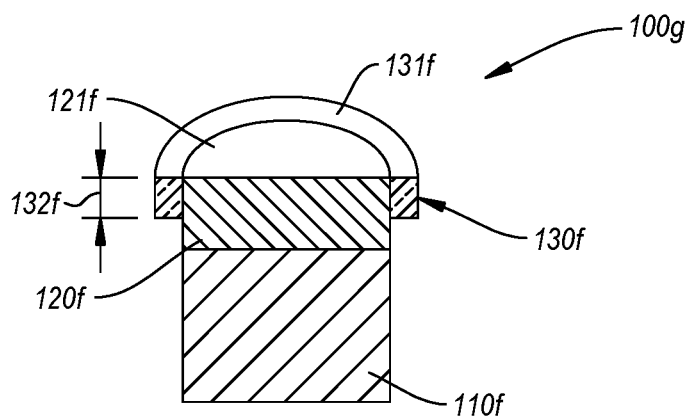
FIG. 7 is an isometric cutaway view of a superhard bearing element according to another embodiment.

In an embodiment, a lubricant body may laterally or peripherally surround at least a portion of the bearing surface of a superhard bearing element. For example, FIG. 7 illustrates a superhard bearing element 100f and a lubricant body 130f that lateral surrounds at least a portion of the outermost periphery of superhard bearing surface 121f of the superhard table 120f of superhard bearing element 100f. Except as otherwise described herein, the superhard bearing element 100f and its materials, elements, components, or features may be similar to or the same as any of the superhard bearing element 100, 100a, 100b, 100c, 100c', 100d, 100e (FIGS. 1-6) and their corresponding materials, elements, components, and features. For example, the superhard table 120f includes the superhard bearing surface 121f, and which may be bonded to substrate 110f, similar to the superhard bearing element 100 (FIG. 1).

In an embodiment, the lubricant body 130f may exhibit complete or partial annular geometry that at least partially laterally surrounds the superhard table 120f and/or superhard bearing surface 121f. For example, the lubricant body 130f may have a height 132f, which may be less than or substantially equal to a height or thickness of the superhard bearing element 100f. In an embodiment, the height 132f of the lubricant body 130f may be less than the height or thickness of the superhard table 120f, such as about 500 µm to about 1000 µm, or about 500 µm to about 750 µm. It should be appreciated, however, that the height 132f of the lubricant body 130f may be the same as the thickness of superhard table 120f or greater than the thickness of the superhard table 120f, as desired. The lubricant body 130f may be secured or positioned about the superhard table 102f via press-fitting, brazing, adhesive bonding, or combinations thereof.

In some embodiments, the lubricant body 130f may include a lubrication surface 131f, which may be approximately coplanar with the superhard bearing surface 121f. As described above, the superhard bearing surface 121f may be approximately planar, and the lubrication surface 131f may also be approximately planar and may lie in an approximately the same plane as the superhard bearing surface 121f. Alternatively, the bearing surface may be nonplanar (e.g., convex, concave, etc.), and the lubrication surface may form an extension to the superhard bearing surface (i.e., the lubrication surface may lie along an imaginary extension of the bearing surface).

Figure 8A:
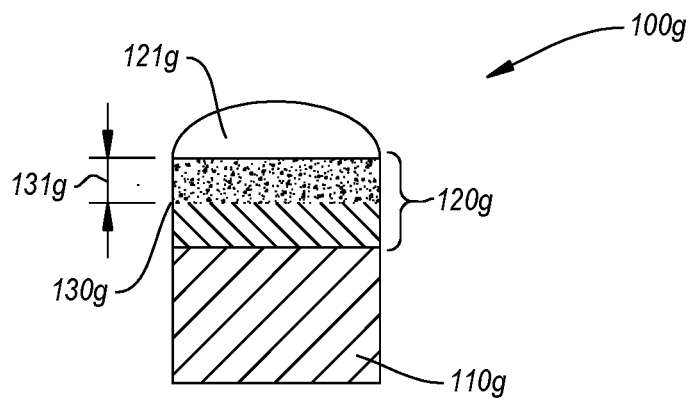
FIG. 8A is an isometric cutaway view of a superhard bearing element according to yet another embodiment.

Generally, a lubrication body may form an independent component that may be inserted into an opening in the superhard bearing element, positioned about the superhard bearing element bearing element, attached to the superhard bearing element, or combinations thereof. However, in some embodiments, a superhard table may be impregnated with lubricating particles. FIG. 8A illustrates a superhard bearing element 100g that may include a superhard table 120g bonded to a substrate 110g according to one or more embodiments. For example, the superhard table 120g may include or may be impregnated with lubricant to define a lubricant body 130g. Except as otherwise described herein, the superhard bearing element 100g and its materials, elements, components, or features may be similar to or the same as any of the superhard bearing element 100, 100a, 100b, 100c, 100c', 100d, 100e, 100f (FIGS. 1-7) and their corresponding materials, elements, components, and features.

As described above, in some embodiments, the superhard table 120g may include polycrystalline diamond. Moreover, the superhard table 120g may be at least partially leached (e.g., to remove an infiltrant). In an embodiment, the leached portion of the superhard table 120g may be backfilled with lubricant to form the lubricant body 130g, such as HBN particles and/or graphite particles. For example, the superhard table 120g may be leached to a depth 131g (as measured from a superhard bearing surface 121g) and the lubricant body 130g may be backfilled into the interstitial spaces available after leaching (e.g., to the depth 131g). For example, HBN particles and/or graphite particles have a size smaller than the interstitial spaces diameter may be used, such as about 1 µm to about 50 µm, or about 5 µm to about 45 µm. For example, the depth 131g may be 10 µm to about 500 µm, such as about 50 µm to about 250 µm, about 50 µm to about 150 µm, or about 75 µm to about 175 µm.

In an embodiment, the superhard table 120g may be leached completely or substantially completely leached. For example, leaching the superhard table 120g may detach the superhard table 120g from an initial substrate present during HPHT sintering of the superhard table 120g. Further, the superhard table 120g may be backfilled to a desired depth, such as to the depth 131g, with lubricant body 130g. In an embodiment, the superhard table 120g may be reattached to the substrate 110g (e.g., after being backfilled with the lubricant body 130g), such as via brazing or via an HPHT bonding process. In an embodiment, the superhard table 120g may be first reattached to the substrate and backfilled with lubricant material thereafter.

In some embodiments, the lubricant body 130g may form an approximately uniform layer or portion of the superhard table 120g. For example, the lubricant body 130g may have an approximately even or uniform distribution with the superhard table 120g to the depth 131g. Moreover, distribution of the lubricant body 130g within the superhard table 120g may terminate at the depth 131g (e.g., at the depth 131g the lubricant body 130g may form or follow an imaginary surface that may be generally parallel to the superhard bearing surface 121g). For example, the depth 131g of the lubricant body 130g may be approximately uniform. In some embodiments, the entire superhard bearing surface 121g may include lubricant body 130g impregnated into the superhard table 120g.

In one or more embodiments, lubricant may be added to and/or impregnated into the superhard table 120g. For example, lubricant may be rubbed, burnished, or otherwise applied to the surface of the superhard table 120g. Additionally or alternatively, the lubricant may be dispersed, infiltrated, or impregnated into an unleached and/or backfilled superhard table 120g. In some embodiments, solids, such as HBN and/or boric acid may be impregnated into the unleached and/or backfilled superhard table 120g to form the lubricant body 130g.

Figure 8B:
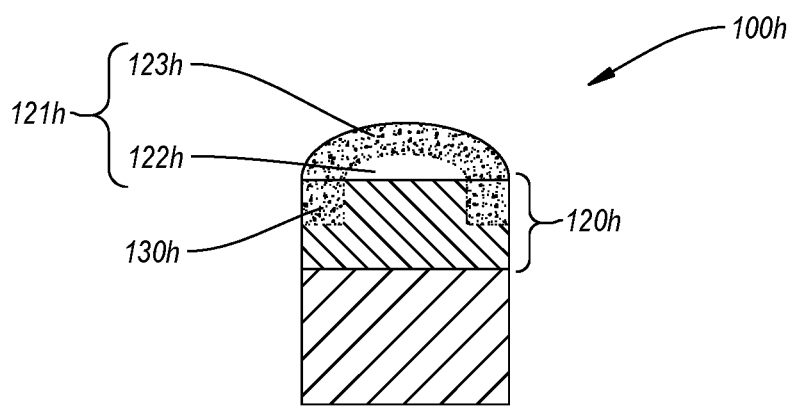
FIG. 8B is an isometric cutaway isometric view of a superhard bearing element according to still another embodiment.

FIG. 8B illustrates a superhard bearing element 100h that includes a superhard bearing surface 121h formed by superhard table 120h according to an embodiment. Except as otherwise described herein, the superhard bearing element 100h and its materials, elements, components, or features may be similar to or the same as any of the superhard bearing elements 100, 100a, 100b, 100c, 100c', 100d, 100e, 100f, 100g (FIGS. 1-8A) and their corresponding materials, elements, components, and features. In an embodiment, only a portion of the superhard bearing surface 121h may include lubricant body 130h that may be impregnated into the superhard table 120h.

In an embodiment, an inner portion 122h of the superhard bearing surface 121h may be free of the lubricant body 130h. For example, an outer portion 123h of the superhard bearing surface 121h may include the lubricant body 130h, with the outer portion 123h may surround the inner portion 122h. In some embodiments, the portion of the superhard bearing surface 121h that includes the lubricant body 130h as well as the portion of the superhard bearing surface 121h that is substantially free of the lubricant body 130h may have any number of suitable shapes and configurations (e.g., an inner portion of the bearing surface may include lubricant body while an outer portion of the bearing service may be substantially free of a lubricant material). For example, the outer portion 123h may be selectively leached to remove, for example, a catalyst from the superhard table 120h made of polycrystalline diamond to selectively form a leached region having a selected geometry such as the annular geometry shown in FIG. 8B. The outer portion 123h may then be backfilled with lubricant to form the lubricant body 130h by any of the techniques previously described.

Figure 9A:
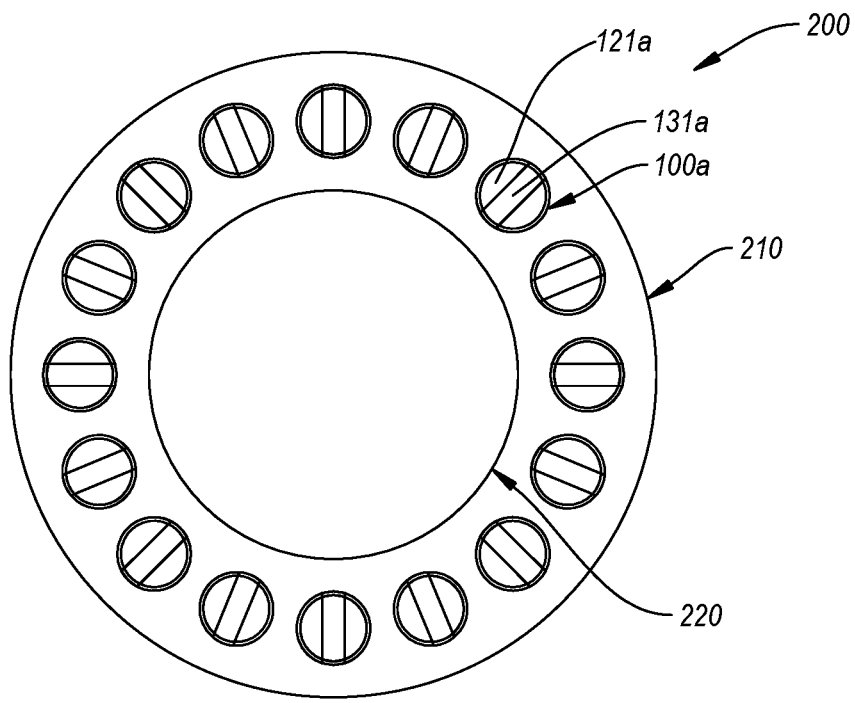
FIG. 9A is a top plan view of a lubricated thrust-bearing bearing assembly according to an embodiment.

FIG. 9A illustrates a thrust-bearing assembly 200 according to an embodiment. In some embodiments, the thrust-bearing assembly 200 includes a support ring 210 and a plurality of superhard bearing elements 100a secured to the support ring 210 (not all labeled), with each of the superhard bearing elements 100a including a superhard bearing surface 121a. More specifically, the superhard bearing elements 100a may be secured to the support ring 210 with any number of suitable techniques, such as by brazing, press-fitting, threadedly attaching, fastening with a fastener, combinations of the foregoing, or another suitable technique. The superhard bearing elements 100a may be arranged in one or more rows about the support ring 210 (e.g., about a rotation axis). Generally, the support ring 210 may include any suitable material or combination of materials, which may vary from one embodiment to another. For example, the support ring 210 may be manufactured from steel (e.g., alloy, tool steel, etc.), stainless steel, cemented carbide (e.g., cobalt-cemented tungsten carbide), or combinations thereof, etc. Additionally, the thrust-bearing assembly 200 may include an opening 220, which may accept a rotating or stationary machine element or component, such as a shaft (described below in more detail).

In an embodiment, each of the superhard bearing elements 100a includes a lubricant body and a lubrication surface 131a (not all labeled) formed thereby. Generally, the thrust-bearing assembly 200 may include one or more of any of the superhard bearing elements described herein as well as combinations thereof. In an embodiment, the thrust-bearing assembly 200 includes a plurality of superhard bearing elements 100a, each having a slot therein, which secures each lubricant body.

Generally, orientation of the superhard bearing elements 100a may vary from one embodiment to another. In some embodiments, the superhard bearing elements service 100a may be oriented such that one, some, or all of the major sides of the lubrication surfaces 131a may be approximately or substantially aligned with a radius of the of the support ring 210 (e.g., extending from a center of rotation of the support ring 210 to center of the corresponding superhard bearing element 100a). In other words, the major sides of the lubrication surfaces 131a may extend toward the center of rotation of the thrust-bearing assembly 200 (e.g., may be parallel to one or more radii of the support ring 210).

Figure 9B:
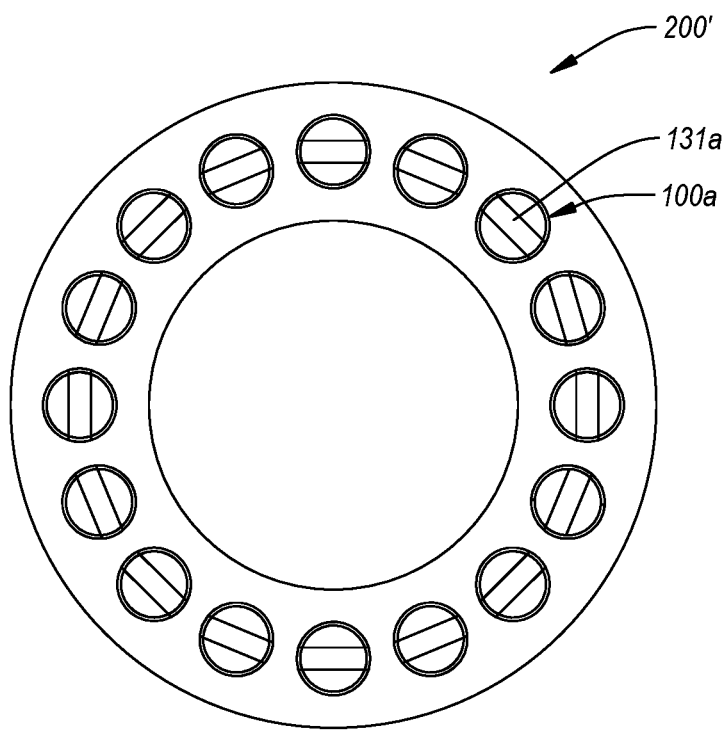
FIG. 9B is a top plan view of a lubricated thrust-bearing bearing assembly according to another embodiment.

Alternatively, as shown in FIG. 9B, a thrust-bearing assembly 200' may include superhard bearing elements 100a that may have lubrication surface(s) 131a oriented in a non-parallel manner relative to one or more radii of the support ring 210. For example, the major sides of one, some, or all of the lubrication surfaces 131a may be approximately perpendicular to corresponding radii that may extend from the center of rotation to centers of corresponding superhard bearing elements 100a.

Figure 9C:
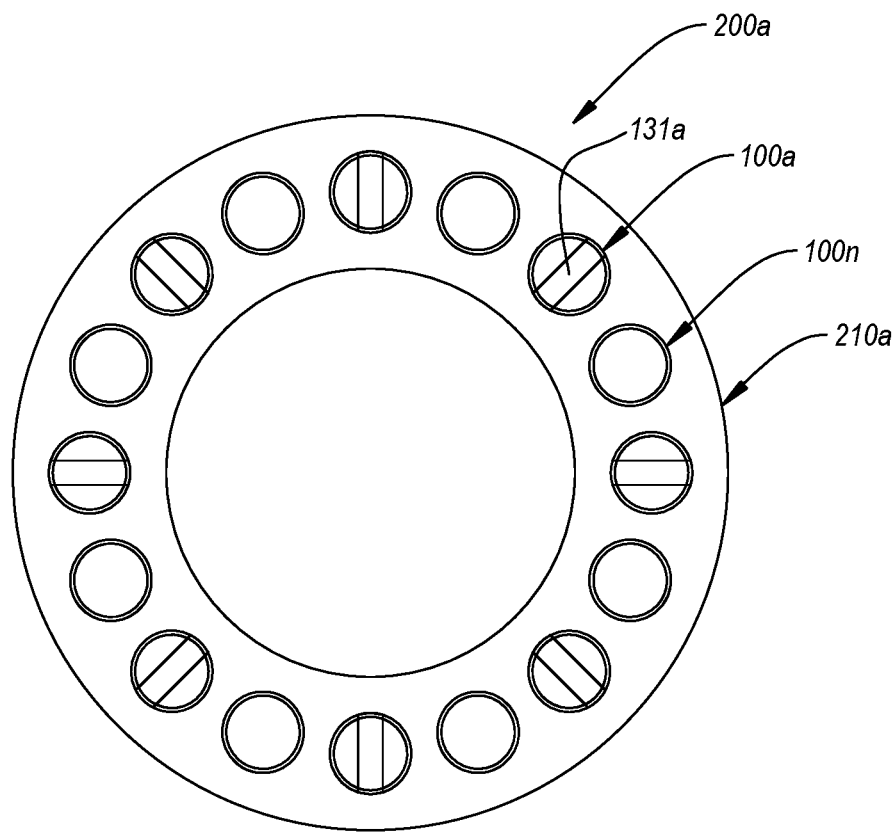
FIG. 9C is a top plan view of a lubricated thrust-bearing bearing assembly according to yet another embodiment.

FIG. 9C illustrates a thrust-bearing assembly 200a that has one or more superhard bearing elements 100a that do not include lubrication surface, and superhard bearing elements 100n each of which includes a lubrication surface 131a. Each of the superhard bearing elements 100a, 100n (not all labeled) may be secured to a support ring 210a. Except as otherwise described herein, the thrust-bearing assembly 200a and its materials, elements, components, or features may be similar to or the same as the thrust-bearing assembly 200 (FIG. 9A) and corresponding materials, elements, components, and features.

In some embodiments, the superhard bearing elements 100a and the superhard bearing elements 100n may be alternatingly circumferentially positioned about a support ring 210a (e.g., each superhard bearing elements 100a may be followed by and may be adjacent to superhard bearing elements 100n). Alternatively, the superhard bearing elements 100a and/or the superhard bearing elements 100n may be grouped together, such that several of the superhard bearing elements 100a are positioned circumferentially next to one another and/or several superhard bearing elements 100n are positioned circumferentially next to one another. It should be appreciated, however, that particular arrangement and alternating or non-alternating combinations of the superhard bearing elements 100a and 100n may vary from one embodiment to the next.

In some embodiments, the exposed top surfaces of the superhard elements 100a may be entirely comprised of lubricant (e.g., the lubricant surfaces 131a may cover the entire surface of the elements 100a). In other words, the superhard bearing elements 100n may alternate with elements that have the entire top surfaces thereof formed by a lubricant. For example, the superhard bearing elements 100n may alternate with elements that include a lubricant body (e.g., graphite) forming the bearing surfaces thereof.

Figure 10:
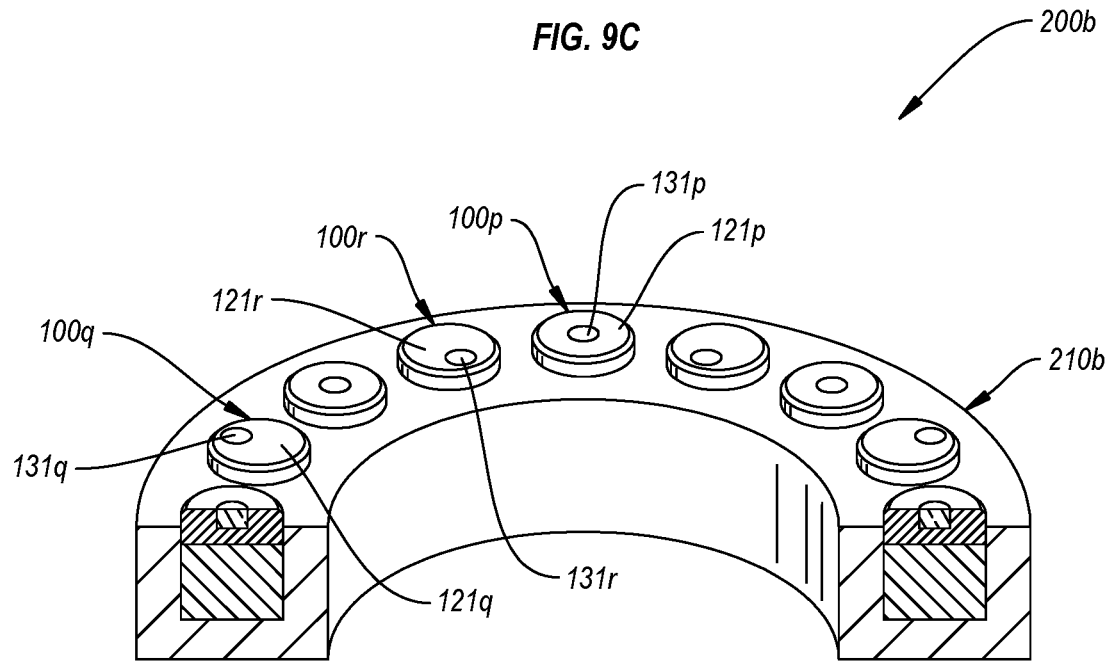
FIG. 10 is an isometric cutaway view of a lubricated thrust-bearing bearing assembly according to yet another embodiment.

Generally, a lubricant body may be positioned at any suitable location within one or more superhard bearing elements/attached to a support ring. Furthermore, a lubrication surface may be positioned at any suitable location relative to the superhard bearing surface and/or relative to a center of the superhard bearing surface. FIG. 10, for example, illustrates a thrust-bearing assembly 200b that includes superhard bearing elements 100p, 100q, 100r secured to a support ring 210b. The superhard bearing elements 100p, 100q, 100r may include corresponding superhard bearing surfaces 121p, 121q, 121r and lubrication surfaces 131p, 131q, 131r (not all labeled).

Generally, the lubrication surfaces 131p, 131q, 131r may be smaller than the superhard bearing surfaces 121p, 121q 121r. The lubrication surfaces 131p, 131q, 131r may be arranged such that the lubricant may be distributed to multiple locations or regions on one or more of the superhard bearing surfaces 121p, 121q, 121r. More specifically, in an embodiment, a center of the lubrication surface 131p may be aligned with a center of the superhard bearing surfaces 121p (e.g., concentrically aligned), and centers of the lubrication surface 131q, 131r may be offset from respective centers of the superhard bearing surfaces 121q, 121r.

Moreover, the superhard bearing element 100p, 100q, 100r may be arranged sequentially on the support ring 210b. For example, the lubrication surface 131p, 131q, 131r of the respective adjacently positioned superhard bearing element 100p, 100q, 100r may be offset (e.g., radially and/or laterally) relative to one another. In an embodiment, as an opposing bearing surface and the superhard bearing surfaces 121p, 121q, 121r rotate relative to and/or in contact with each other, the lubrication surfaces 131p, 131q, 131r may lubricate different radial portions of opposing bearing surface(s).

Figure 11A:
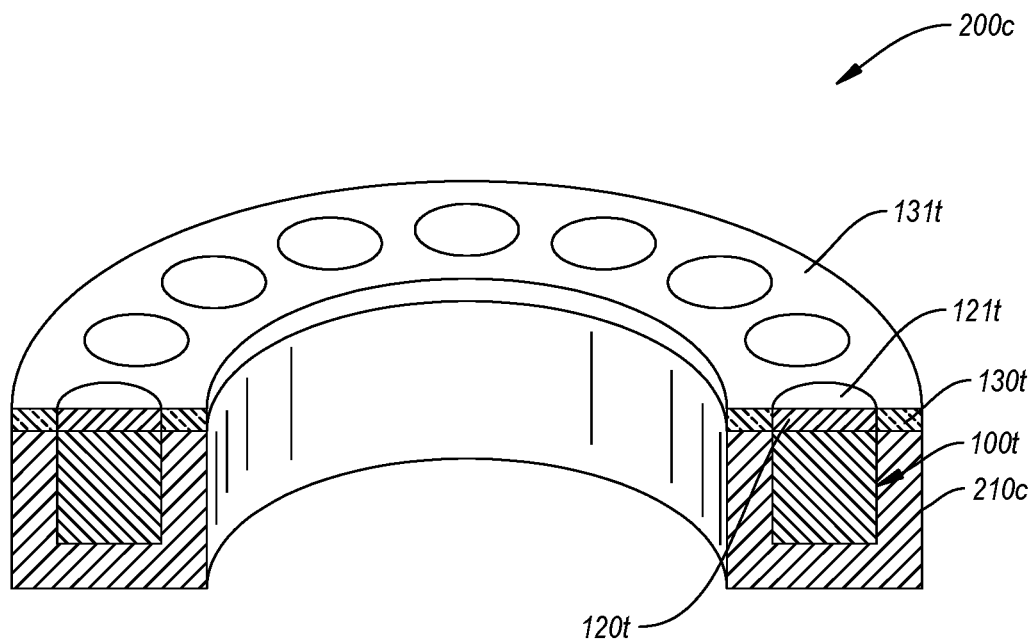
FIG. 11A is an isometric cutaway view of a lubricated thrust-bearing bearing assembly according to still another embodiment.
Figure 11B:
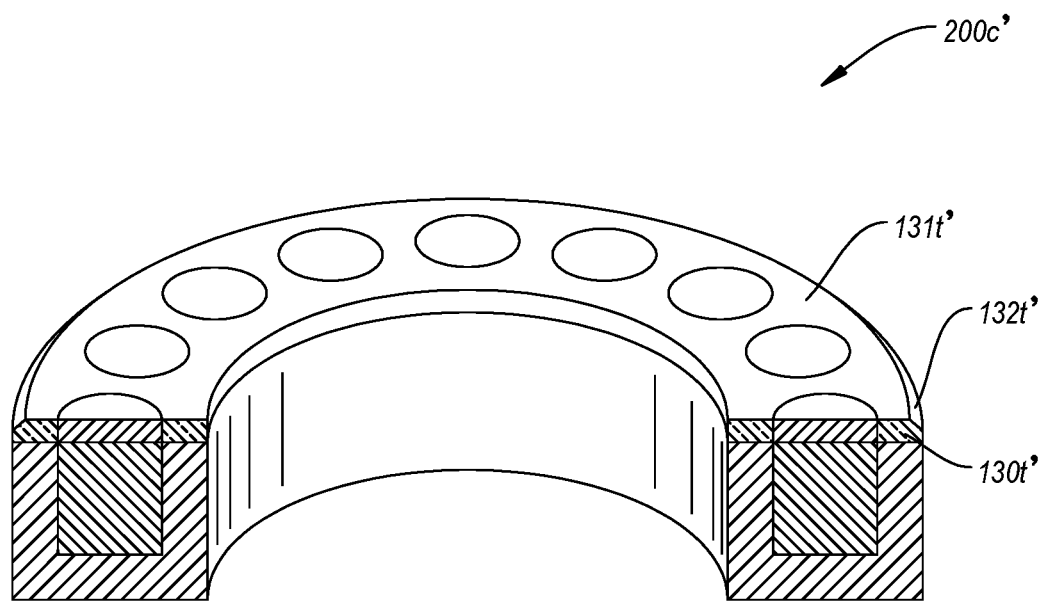
FIG. 11B is an isometric cutaway view of a lubricated thrust-bearing bearing assembly according to one or more other embodiments.

In some embodiments, the lubricant body may at least partially laterally surround one or more bearing elements of a bearing assembly. FIGS. 11A-11B illustrate bearing assemblies 200c, 200c' that include superhard bearing elements laterally surrounded by a lubricant body, according to one or more embodiments. The thrust-bearing assembly 200c includes superhard bearing elements 100t laterally surrounded by a lubricant body 130t. Except as otherwise described herein, the thrust-bearing assembly 200c and its materials, elements, components, or features may be similar to or the same as any of the bearing assemblies 200, 200a, 200b (FIGS. 9A-10) and their corresponding materials, elements, components, and features.

In an embodiment, all of the superhard bearing elements 100t may be laterally surrounded by the lubricant body 130t, which may include a lubrication surface 131t. For example, each of the superhard bearing elements 100t may include a superhard table 120t that may be at least partially laterally surrounded by the lubricant body 130t. As described above, each of the superhard tables 120t (not all labeled) may include a superhard bearing surface 121t. In some embodiments, the lubrication surface 131t may be substantially coplanar with one, some, or all of the superhard bearing surfaces 121t and/or may provide additional surface area for supporting and/or carrying load experienced by the thrust-bearing assembly 200c, which may increase the bearing load that the thrust-bearing assembly 200c may carry during operation (e.g., as compared with a bearing assembly that does not include a lubrication surface that surrounds at least some of the bearing surfaces).

As described above, the lubricant body 130t may include any suitable lubricant or combinations thereof. Moreover, the lubricant body 130t may be substantially solid and/or monolithic. For example, the lubricant body 130t may be manufactured from a single piece or from multiple pieces or blocks of graphite by machining such piece(s) to include openings to accommodate the superhard bearing elements 100t (e.g., to accommodate superhard bearing surfaces 121t. Additionally or alternatively, powder lubricant (e.g., graphite powder, tungsten disulfide powder, or molybdenum disulfide powder) may be compressed (cold-pressed, hot-pressed, etc.) together to form a substantially unitary lubricant body 130t. In some embodiments, a lubricant body may comprise a composite material, such as, for example lubricant powder, lubricant whiskers, or lubricant fibers may be placed into a matrix (e.g., graphite powder in an epoxy matrix), which collectively may form a unitary lubricant body 130t.

In an embodiment, the lubrication surface 131t and the superhard bearing surface 121t may collectively form a substantially monolithic surface. For example, the superhard bearing surface 121t may carry at least some of the thrust load experienced by the thrust-bearing assembly 200c of the thrust-bearing assembly 200c. In some embodiments, the lubrication surface 131t may carry at least some of the load experienced by the thrust-bearing assembly 200c and may supply lubrication to the superhard bearing surfaces 121t and/or to an opposing bearing surface.

For example, as an opposing bearing surface rotates relative to and/or in contact with the lubrication surface 131t, relative rotation of the opposing bearing surface and the lubrication surface 131t may provide lubrication to the opposing bearing surface and/or to the superhard bearing surfaces 121t. As mentioned above, lubrication between the opposing surface and the superhard bearing surfaces 121t may reduce friction and/or heat generated during the relative rotation of the superhard bearing surfaces 121t and the opposing bearing surface.

In an embodiment, the lubricant body 130t may include a sharp edge between the lubrication surface 131t and an inner peripheral surface of the lubricant body 130t. Similarly, the lubricant body 130t may include a sharp edge between the lubrication surface 131t and an outward peripheral surface of the lubricant body 130t. In some embodiments, as shown in FIG. 11B, the thrust-bearing assembly 200c' may include a lubricant body 130t' that may include a chamfer 132t', according to an embodiment. Except as otherwise described herein, the thrust-bearing assembly 200c' and its materials, elements, components, or features may be similar to or the same as any of the bearing assemblies 200, 200a, 200b, 200c (FIGS. 9A-11A) and their corresponding materials, elements, components, and features. For example, the lubricant body 130t' may be similar to the lubricant body 130t (e.g., with the exception of the chamfer 132t, which may be formed between a lubrication surface 131e and an outer peripheral surface of the lubricant body 130t').

Figure 12:
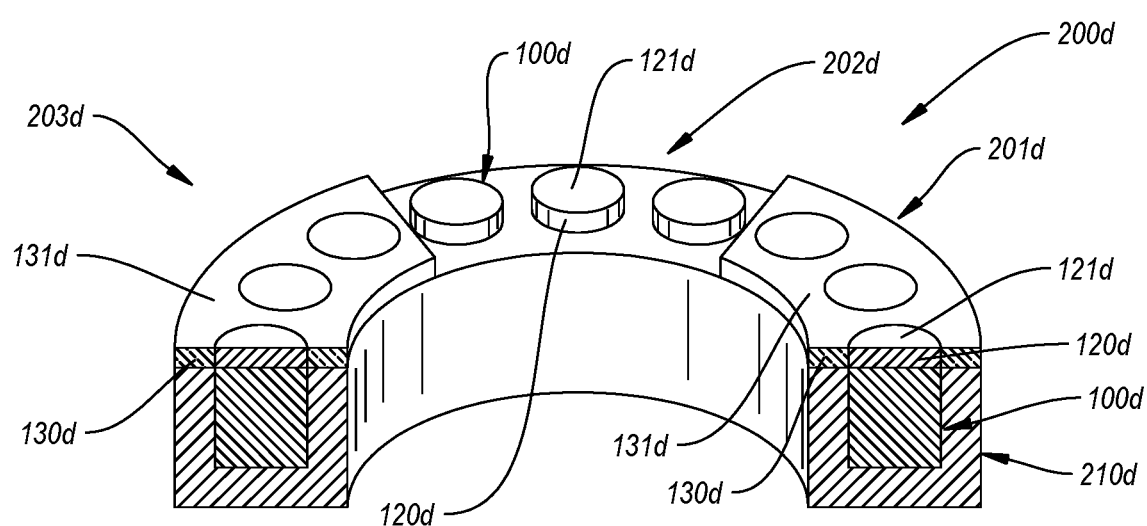
FIG. 12 is an isometric cutaway view of a lubricated thrust-bearing bearing assembly according to an embodiment.

Also, as described above, in some embodiments, only some superhard bearing elements of a bearing assembly may be surrounded by the lubricant body, while other superhard bearing elements may be exposed and/or substantially free of the lubricant body. FIG. 12 illustrates a thrust-bearing assembly 200d that includes superhard bearing elements 100d (not all labeled) mounted on a support ring 210d. Except as otherwise described herein, the thrust-bearing assembly 200d and its materials, elements, components, or features may be similar to or the same as any of the bearing assemblies 200, 200a, 200b, 200c, 200c' (FIGS. 9A-11B) and their corresponding materials, elements, components, and features. For example, the support ring 210d may be similar to or the same as the support ring 210 (FIG. 9A).

In an embodiment, different groups of the superhard bearing elements 100d may be at least partially or entirely surrounded by respective lubricant bodies 130d. For example, the thrust-bearing assembly 200d may include regions 201d, 203d that each have superhard bearing elements 100d (in those regions) completely surrounded by a respective lubricant body 130d. Additionally or alternatively, the thrust-bearing assembly 200d may include one or more portions that include superhard bearing elements 100d that are not enclosed or surrounded by a lubricant body (e.g., region 202d). Along the portion 202d, for example, the superhard bearing elements 100d may be at least partially exposed and not surrounded by a lubricant body.

In an embodiment, each of the superhard bearing elements 100d may include a superhard table 120d that may have a superhard bearing surface 121 (not all labeled). For example, within regions 201d and 203d, the superhard tables 120d may be surrounded by the respective portions of the lubricant body 130d, while in the region 202d, at least a portion of the superhard table 120d may be exposed. In some embodiments, the regions including a lubrication body may alternate with other regions (e.g., on the support ring 210d, the portions 201d, 202d, 203d may be sequentially located about a center axis or rotation axis of the thrust-bearing assembly 200d.

Under some operating conditions, absence of the lubricant body 130d in the region 202d of the thrust-bearing assembly 200d may facilitate air flow and/or fluid (e.g., drilling mud) through the thrust-bearing assembly 200d and the bearing apparatus that includes the thrust-bearing assembly 200d. For example, air and/or fluid (e.g., drilling mud) may flow about and between the superhard bearing elements 100d (e.g., about and between the superhard tables 120*d*) in the region 202*d*. Such air and/or fluid flow may cool the thrust-bearing assembly 200*d*, one or more of the superhard bearing surfaces 121*d*, a bearing surface opposing the superhard bearing surface 121*d*, an opposing bearing assembly, or combinations thereof. Moreover, in some embodiments, the opposing bearing surface may contact and/or move over the lubrication surfaces 131*d* in the regions 201*d*, 203*d* of the thrust-bearing assembly 200 (e.g., in the regions 201*d*, 203*d*), such that the lubricant therefrom contacts and/or adheres to at least some of the opposing bearing surface. In at least one embodiment, the lubricant from the regions 201*d*, 203*d* may contact one or more of the superhard bearing surface 121*d*.

Figure 13:
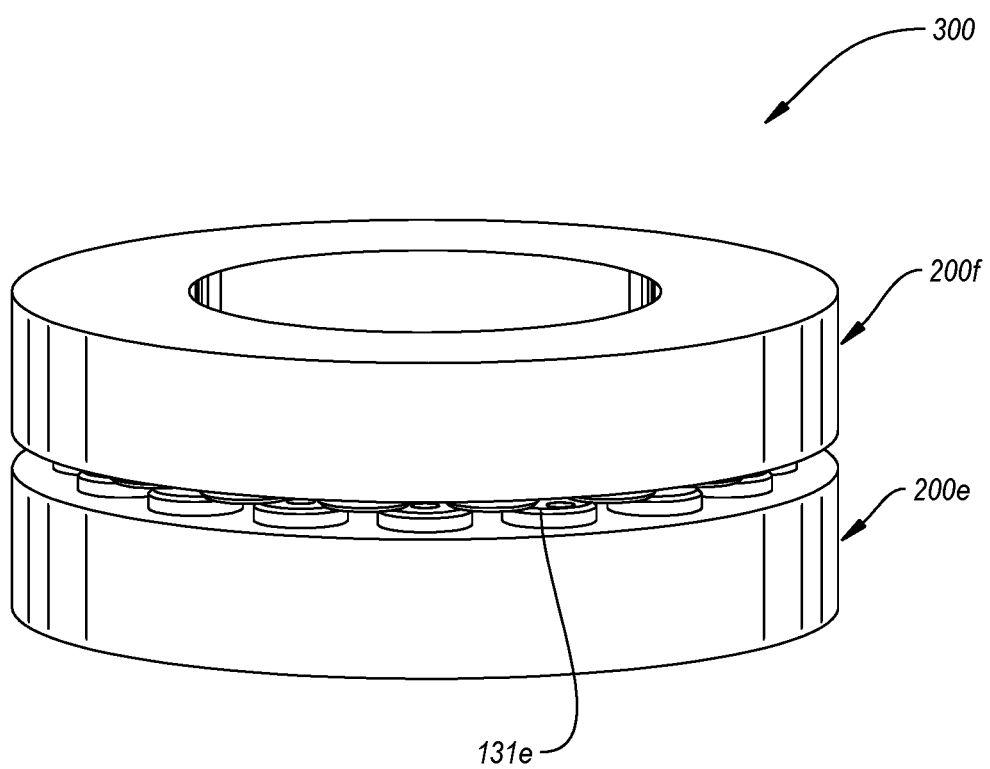
FIG. 13 is an isometric view of a lubricated thrust-bearing bearing apparatus according to still another embodiment.

As mentioned above, the bearing surface(s) of a first bearing assembly may engage and/or may be in contact with one or more opposing bearing surfaces. FIG. 13 illustrates a bearing apparatus 300 that includes a first thrust-bearing assembly 200*e* and a second, opposing thrust-bearing assembly 200*f* engaged with the first thrust-bearing assembly 200*e*. Except as otherwise described herein, the bearing assemblies 200*e* and 200*f* and their respective materials, elements, components, or features may be similar to or the same as any of the bearing assemblies 200, 200*a*, 200*b*, 200*c*, 200*c'*, 200*d* (FIGS. 9A-12) and their corresponding materials, elements, components, and features. For example, the first thrust-bearing assembly 200*e* may be the same as the thrust-bearing assembly 200*b* (FIG. 10).

The first thrust-bearing assembly 200*e* and the second thrust-bearing assembly 200*f* may include opposing bearing surfaces that may be in contact with each other during operation. Also, in some embodiments, as mentioned above, the first thrust-bearing assembly 200*e* may include one or more lubrication surfaces (e.g., lubrication surface 131*e*) in contact with one or more superhard bearing surfaces of the second thrust-bearing assembly 200*f*. For example, the lubricant from the lubrication surface 131*e* may contact or interact with one or more superhard bearing surfaces of the first thrust-bearing assembly 200*e* and/or the second thrust-bearing assembly 200*f* and/or may adhere thereto (e.g., electrostatically, chemically, mechanically, combinations thereof, etc.).

Generally, the first thrust-bearing assembly 200*e* may be a stator, while the second thrust-bearing assembly 200*f* may be a rotor, or vice versa. Moreover, in some embodiments, both the first thrust-bearing assembly 200*e* and the second thrust-bearing assembly 200*f* may rotate. In any case, under some operating conditions, the respective superhard bearing surfaces of the first thrust-bearing assembly 200*e* and the second thrust-bearing assembly 200*f* may rotate relative to one another and/or may be in contact with one another. In an embodiment, as the respective superhard bearing surfaces of the first thrust-bearing assembly 200*e* and the second thrust-bearing assembly 200*f* move relative to each other, the lubricant (e.g., from the lubrication surface 131*e*) may lubricate the superhard bearings surfaces and/or reduce friction therebetween. Also, in some embodiments, both the first thrust-bearing assembly 200*e* and second thrust-bearing assembly 200*f* may include one or more lubrication surfaces, which may supply lubrication to at least some of the superhard bearing surfaces of the first thrust-bearing assembly 200*e* and second thrust-bearing assembly 200*f*.

Figure 14:
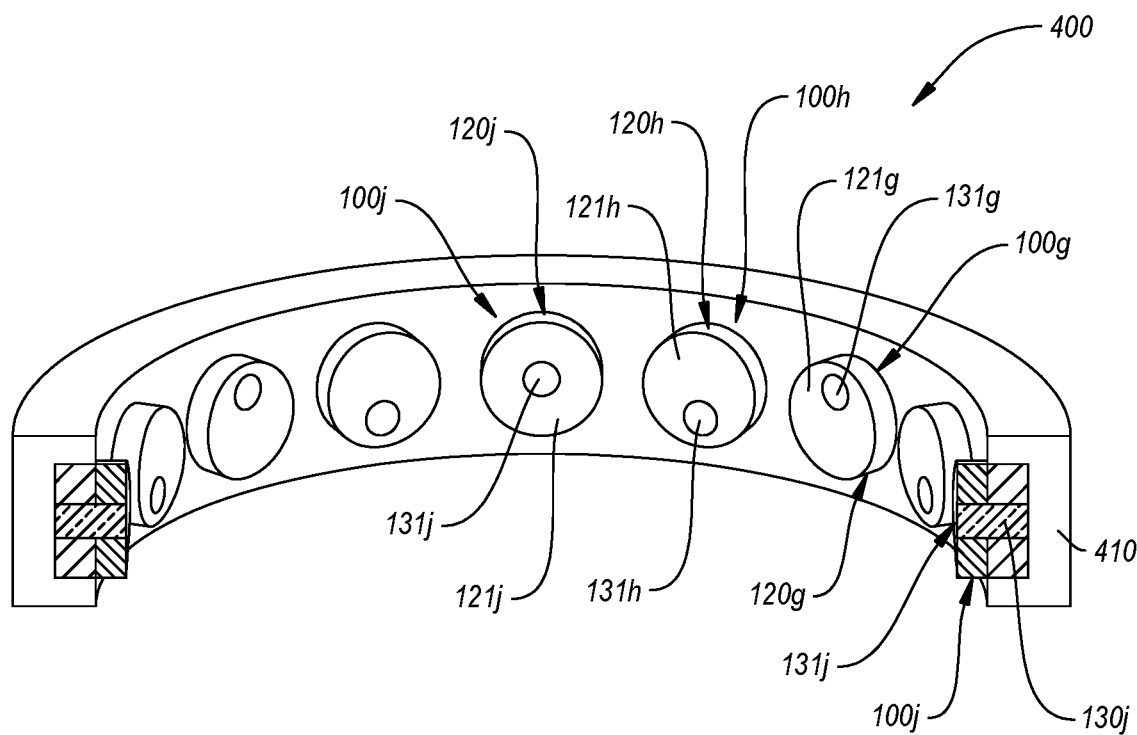
FIG. 14 is an isometric cutaway view of a lubricated radial bearing assembly according to an embodiment.

In one or more embodiments, the bearing assembly may be a radial bearing assembly. FIG. 14 illustrates a first radial bearing assembly 400 that includes superhard bearing surfaces 121*g*, 121*h*, 121*j* and lubrication surfaces 131*g*, 131*h*, 131*j*. Except as otherwise described herein, the radial bearing assembly 400 and its respective materials, elements, components, or features may be similar to or the same as any of the thrust-bearing assemblies 200, 200*a*, 200*b*, 200*c*, 200*c'*, 200*d*, 200*e*, 200*f* (FIGS. 9A-13) and their corresponding materials, elements, components, and features. For example, the radial bearing assembly 400 may include superhard bearing elements 100*g*, 100*h*, 100*j* (not all labeled) mounted on a support ring 410 (e.g., the superhard bearing elements 100*g*, 100*h*, 100*j* may be radially distributed about center axis or rotation axis of the radial bearing assembly 400); the superhard bearing elements 100*g*, 100*h*, 100*j* may be similar (e.g., except in bearing surface geometry) to superhard bearing elements 100*r*, 100*q*, 100*p* of the thrust-bearing assembly 200*b* (FIG. 10). The superhard bearing elements 100*r*, 100*q*, 100*p* may have approximately cylindrical shapes and/or the lubrication surfaces 131*g*, 131*h*, 131*j* (not all labeled) may have approximately circular shapes.

In an example, superhard bearing elements 100*g*, 100*h*, 100*j* may include corresponding superhard tables 120*g*, 120*h*, 120*j* (not all labeled), which may have the corresponding arcuate superhard bearing surfaces 121*g*, 121*h*, 121*j* (not all labeled). In some embodiments, the superhard bearing surfaces 121*g*, 121*h*, 121*j* and the lubrication surface 131*g*, 131*h*, 131*j* may lie along an approximately cylindrical imaginary surface (e.g., the superhard bearing surfaces 121*g*, 121*h*, 121*j* and the lubrication surfaces 131*g*, 131*h*, 131*j* may be approximately concave). In an embodiment, the superhard bearing surfaces 121*g*, 121*h*, 121*j* and the lubrication surfaces 131*g*, 131*h*, 131*j* may collectively carry the load experienced by the radial bearing assembly 400.

In one or more embodiments, the superhard bearing elements 100*g*, 100*h*, 100*j* may include lubricant body therein, which may form corresponding lubrication surfaces 131*g*, 131*h*, 131*j*. For example, lubricant body 130*j* (not all labeled) may for or include the lubrication surface 131*j*, which may provide lubrication to the superhard bearing surfaces of the radial bearing assembly 400 and/or to an opposing bearing surface. In an embodiment, the lubricant body 130*j* may extend between the support ring 410 and the lubrication surface 131*j* (e.g., the superhard bearing element 100*j* may be similar, other than geometry, to the superhard bearing element 100 (FIG. 1)).

Figure 15:
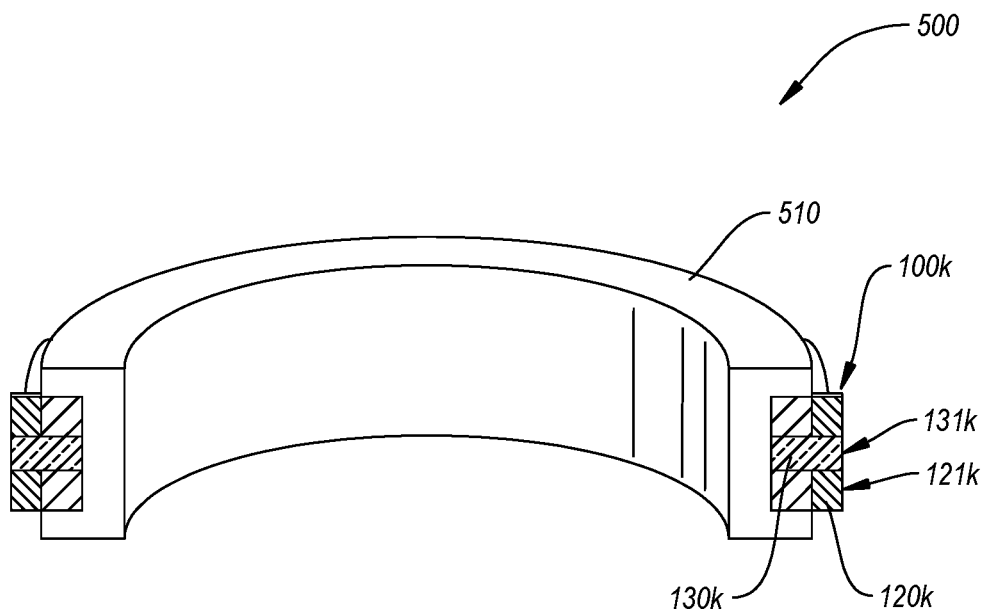
FIG. 15 is an isometric cutaway view of another lubricated radial bearing assembly according to an embodiment.

The bearing surface of the radial bearing assembly 400 may be engaged and/or in contact with an opposing bearing surface. For example, FIG. 15 illustrates a second radial bearing assembly 500, which may include one or more bearing surfaces that may engage the superhard bearing surfaces of the radial bearing assembly 400 (FIG. 14) during operation. Except as otherwise described herein, the radial bearing assembly 500 and its respective materials, elements, components, or features may be similar to or the same as any of the thrust-bearing assemblies 200, 200*a*, 200*b*, 200*c*, 200*c'*, 200*d*, 200*e*, 200*f* and the radial bearing assembly 400 (FIGS. 9A-14) and their corresponding materials, elements, components, and features. For example, the radial bearing assembly 500 may include superhard bearing elements 100*k* (not all labeled) that may be similar to the superhard bearing element 100*j* (FIG. 14).

In some embodiments, the superhard bearing elements 100*k* may have convex superhard bearing surface 121*k* formed by superhard table 120*k* of the superhard bearing elements 100*k*. Generally, the superhard bearing elements 100*k* may be mounted on a support ring 510 (e.g., the superhard bearing elements 100*k* may be radially distributed about a rotation axis of the radial bearing assembly 500). In an embodiment, the radial bearing assembly 500 may include one or more lubrication surfaces, such as lubrication surface 131k, which may be formed by a lubricant body 130k located inside the superhard bearing elements 100k. It should be appreciated that, as described above, the particular lubricant body and/or lubrication surfaces of the radial bearing assembly 500 may vary from one embodiment to the next.

Figure 16:
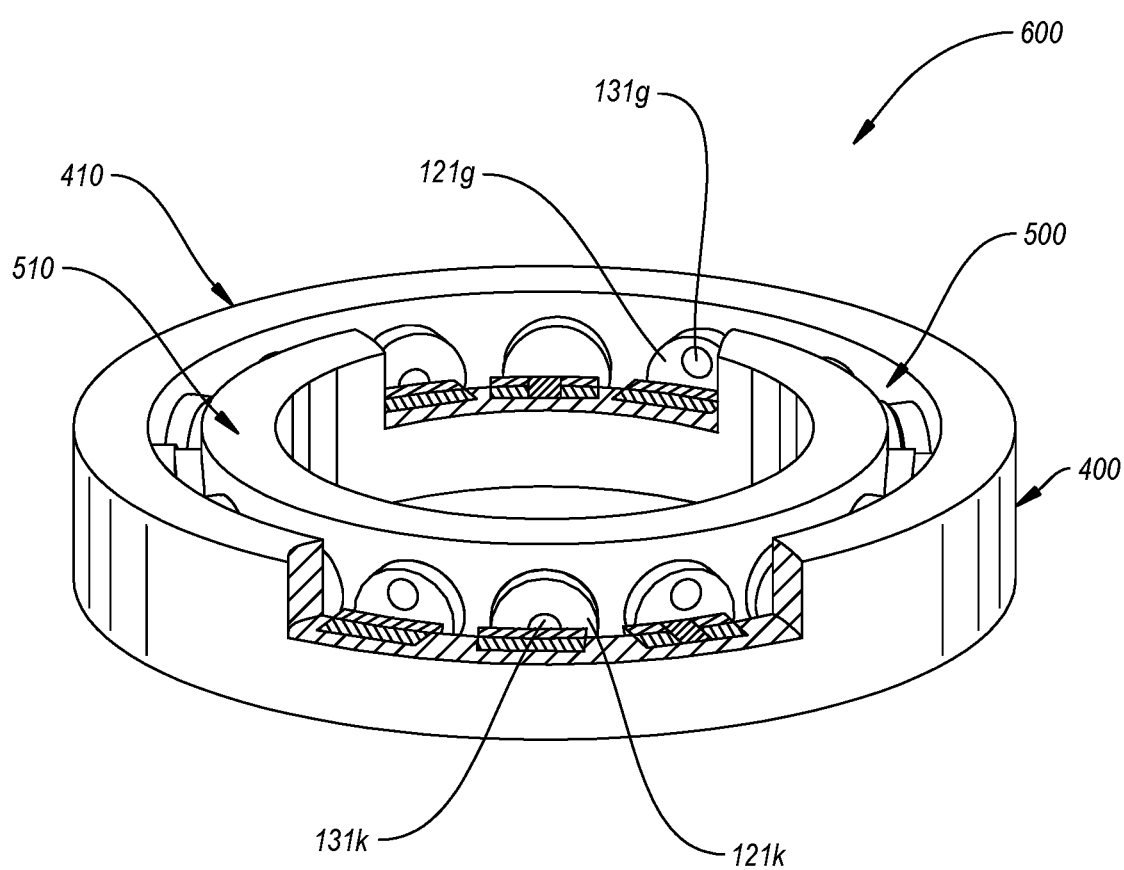
FIG. 16 is an isometric cutaway view of a radial bearing apparatus according to an embodiment.

As illustrated in FIG. 16, the second radial bearing assembly 500 and the first radial bearing assembly 400 may be assembled to together to form a radial bearing apparatus 600 according to one or more embodiments. For example, the superhard bearing surfaces (e.g., superhard bearing surfaces 121g (not all labeled)) and/or lubrication surfaces (e.g., lubrication surface 131g) of the radial bearing assembly 400 may be in contact with the bearing surfaces (e.g., superhard bearing surfaces 121k (not all labeled)) of the second radial bearing assembly 500. In some embodiments, as mentioned above, the second radial bearing assembly 500 also may include one or more lubrication surfaces (e.g., lubrication surface 131k), which may be in contact with one or more bearing surfaces (e.g., superhard bearing surface 121g) of the radial bearing assembly 400.

In an embodiment, at least a portion of the radial bearing assembly 400 may be free of lubrication surfaces (e.g., the superhard bearing surfaces may be continuous and without lubrication surfaces therein, the superhard bearing elements may be located in a region without lubricant bodies of the radial bearing assembly 400, etc.). Similarly, at least a portion of the second radial bearing assembly 500 may be free of lubricant bodies. Furthermore, in some embodiments, the first radial bearing assembly 400 may be free of lubricant therein, and lubricant from the second radial bearing assembly 500 may be supplied to the bearing surfaces of the first radial bearing assembly 400. Conversely, in an embodiment, the second radial bearing assembly 500 may be free of lubricant therein, and lubricant from the first radial bearing assembly 400 may be supplied to the bearing surfaces of the second radial bearing assembly 500.

Figure 17:
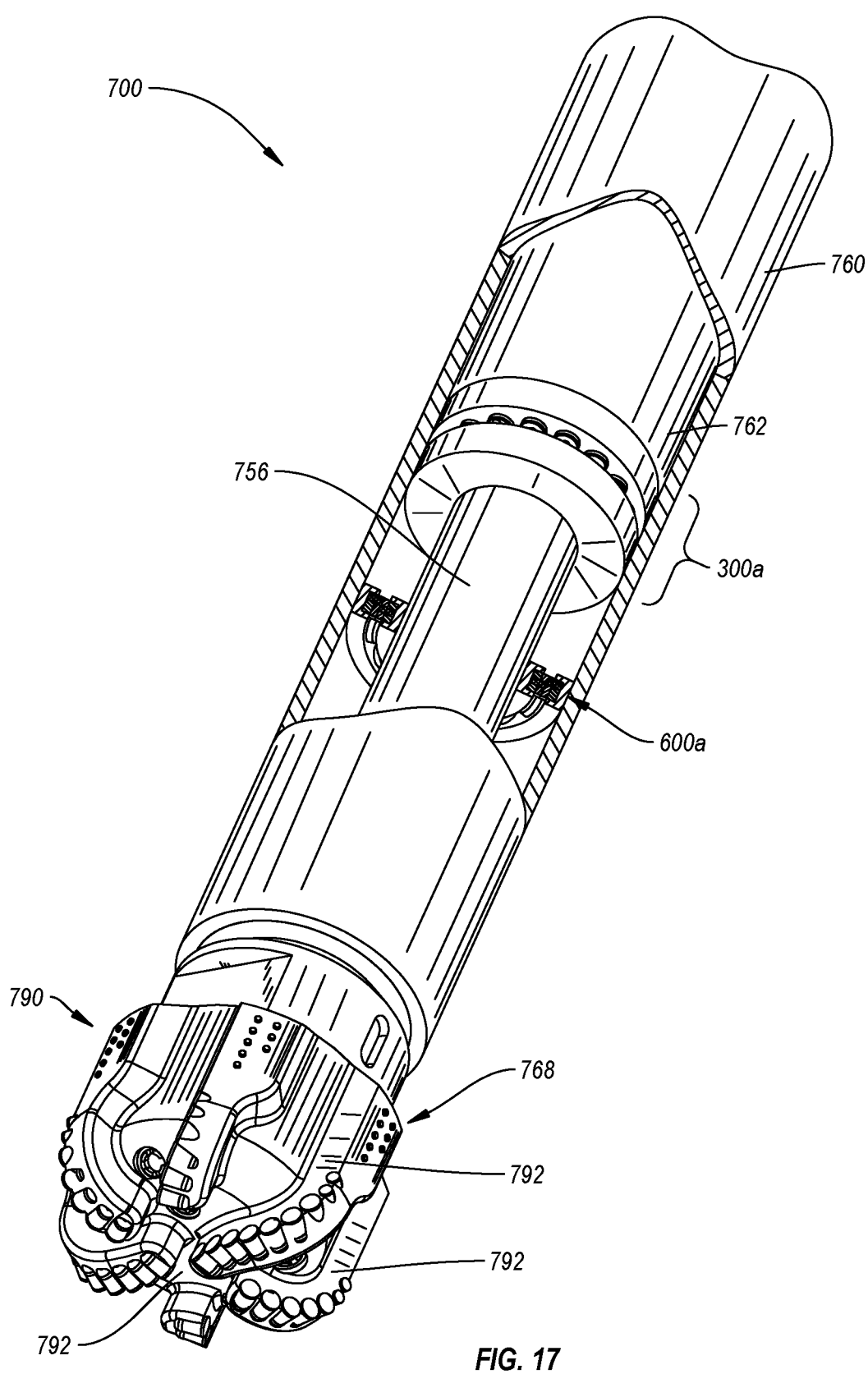
FIG. 17 is an isometric view of a subterranean drilling system according to an embodiment.

FIG. 17 is a schematic isometric cutaway view of a subterranean drilling system 700 according to an embodiment. The subterranean drilling system 700 may include a housing 760 enclosing a downhole drilling motor 762 (i.e., a motor, turbine, or any other device capable of rotating an output shaft) that may be operably connected to an output shaft 756. A thrust-bearing apparatus 300a may be operably coupled to the downhole drilling motor 762. The thrust-bearing apparatus 300a may be configured as any of the previously described thrust-bearing apparatus embodiments (e.g., thrust-bearing apparatus 300 shown in FIG. 13).

Additionally or alternatively, the subterranean drilling system 700 may include a radial bearing apparatus 600a operably connected to the output shaft 756 and/or to the housing 760. The radial bearing apparatus 600a may be configured as any of the previously described radial bearing apparatus embodiments (e.g., the radial bearing apparatus 600 shown in FIG. 16). For example, the radial bearing apparatus 600a may include first radial bearing assembly (e.g., a stator) and second radial bearing assembly (e.g., a rotor) that maybe operably connected to the housing 760 and to the output shaft 756, respectively.

A rotary drill bit 768 may be configured to engage a subterranean formation and drill a borehole and may be connected to the output shaft 756. The rotary drill bit 768 is a fixed-cutter drill bit and is shown comprising a bit body 790 having radially-extending and longitudinally-extending blades 792 with a plurality of PDCs secured to the blades 792. However, other embodiments may utilize different types of rotary drill bits, such as core bits and/or roller-cone bits. As the borehole is drilled, pipe sections may be connected to the subterranean drilling system first thrust-bearing assembly thrust-bearing apparatus 300a to form a drill string capable of progressively drilling the borehole to a greater size or depth within the earth.

In operation, drilling fluid may be circulated through the downhole drilling motor 762 to generate torque and rotate the output shaft 756 and the rotary drill bit 768 attached thereto so that a borehole may be drilled. A portion of the drilling fluid may also be used to lubricate and/or cool opposing bearing surfaces of the stators and rotors of the radial bearing apparatus 600a and/or of the thrust-bearing apparatus 300a. In some operating conditions, as mentioned above, the drilling fluid may facilitate cooling of the radial bearing apparatus 600a and/or of the thrust-bearing apparatus 300a. In some embodiments, substantially no drilling fluid may be used to lubricate the radial bearing apparatus 600a and/or the thrust-bearing apparatus 300a and, instead, one or more lubricant bodies incorporated in the radial bearing apparatus 600a and/or the thrust-bearing apparatus 300a may be used for lubrication.

Although the bearing assemblies and apparatuses described above have been discussed in the context of subterranean drilling systems and applications, in other embodiments, the bearing assemblies and apparatuses disclosed herein are not limited to such use and may be used for many different applications, if desired, without limitation. Thus, such bearing assemblies and apparatuses are not limited for use with subterranean drilling systems and may be used with various mechanical systems, without limitation.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of operating a bearing apparatus, the method comprising:
   producing relative movement between a first bearing assembly and a second bearing assembly, while maintaining contact between first superhard bearing surfaces of the first bearing assembly and the second bearing assembly; and
   distributing lubricant from one or more first solid lubricant bodies to at least the first superhard bearing surfaces.

2. The method of claim 1, further comprising removing at least a portion of the one or more first solid lubricant bodies with friction between the first superhard bearing surfaces and the second bearing assembly, wherein distributing lubricant to at least the first superhard bearing surfaces includes relocating at least the portion of the one or more first solid lubricant bodies to at least a portion of the first superhard bearing surfaces.

3. The method of claim 1, further comprising exposing at least a portion of the one or more first solid lubricant bodies through wear on the first superhard bearing surfaces.

4. The method of claim 1, wherein the relative movement between the first bearing assembly and the second bearing assembly is produced while maintaining contact between the first superhard bearing surfaces of the first bearing assembly and second superhard bearing surfaces of the second bearing assembly.

5. The method of claim 4, wherein distributing lubricant to at least the first superhard bearing surfaces includes distributing the lubricant from the one or more first solid lubricant bodies to the first superhard bearing surfaces and the second superhard bearing surfaces.

6. The method of claim 4, further comprising distributing lubricant from one or more second solid lubricant bodies to at least the second superhard bearing surfaces.

7. The method of claim 6, further comprising removing at least a portion of the one or more second solid lubricant bodies with friction between the first superhard bearing surfaces and the second superhard bearing surfaces, wherein distributing lubricant to at least the second superhard bearing surfaces includes relocating at least the portion of the one or more second solid lubricant bodies to at least a portion of the second superhard bearing surfaces.

8. The method of claim 6, further comprising exposing at least a portion of the one or more second solid lubricant bodies through wear on the second superhard bearing surfaces.

9. The method of claim 1, wherein:
producing a relative movement between a first bearing assembly and a second bearing assembly includes producing a relative rotation between the first bearing assembly and the second bearing assembly, while maintaining contact between the first superhard bearing surfaces of the first bearing assembly and the second bearing assembly; and
one or more surfaces of the first solid lubricant bodies are approximately coplanar with one or more of the plurality of first superhard bearing surfaces.

10. A method of replacing a solid lubricant in a bearing assembly, the method comprising:
providing a support ring having a plurality of superhard bearing elements secured to the support ring; and
positioning a solid lubricant body adjacent to at least one of the plurality of superhard bearing elements.

11. The method of claim 10, wherein positioning a solid lubricant body adjacent to at least one of the plurality of the plurality of superhard bearing elements includes positioning the solid lubricant body to laterally surround at least a portion of an outermost periphery of a superhard bearing surface of one of the plurality of superhard bearing elements.

12. The method of claim 10, wherein positioning a solid lubricant body adjacent to at least one of the plurality of the plurality of superhard bearing elements includes positioning the solid lubricant body on the support ring to laterally surround at least a portion of an outermost periphery of a superhard bearing surface of each of the plurality of superhard bearing elements.

13. The method of claim 10, wherein:
each of the plurality of superhard bearing elements include a superhard table, a substrate bonded to the superhard table, and a recess extending at least partially from the superhard bearing surface into the superhard table; and
positioning a solid lubricant body adjacent to at least one of the plurality of superhard bearing elements includes positioning the solid lubricant body in the recess of a first superhard bearing element of the plurality of superhard bearing elements.

14. The method of claim 13, wherein:
the recess of the first superhard bearing element extends only partially from the superhard bearing surface into the superhard table; and
positioning the solid lubricant body in the recess of the first superhard bearing element includes positioning the solid lubricant in the recess of the first superhard bearing element such that the solid lubricant body extends only partially into superhard table.

15. The method of claim 13, wherein:
the recess of the first superhard bearing element extends from the superhard bearing surface through the superhard table into the substrate; and
positioning the solid lubricant body in the recess of the first superhard bearing element includes positioning the solid lubricant in the recess of the first superhard bearing element such that the solid lubricant body extends through the superhard table into the substrate.

16. The method of claim 10, wherein positioning a solid lubricant body adjacent to at least one of the plurality of superhard bearing elements includes positioning the solid lubricant body adjacent to at least one of the plurality of superhard bearing elements such that an exposed lubrication surface of the solid lubricant body is approximately coplanar with a superhard bearing surface of the at least one of the plurality of superhard bearing elements.

17. The method of claim 10, wherein positioning a solid lubricant body adjacent to at least one of the plurality of superhard elements includes press-fitting the solid lubricant body adjacent at least one of the plurality of superhard elements.

18. The method of claim 10, further comprising brazing the solid lubricant body adjacent at least one of the plurality of superhard elements.

19. The method of claim 10, further comprising removing at least a portion of a previous solid lubricant from a location adjacent to the at least one of the plurality of superhard elements before positioning the solid lubricant body adjacent to the at least one of the plurality of superhard elements.

20. A method of operating a bearing apparatus, the method comprising:
producing a relative movement between a bearing assembly and an additional surface, while maintaining contact between superhard bearing surfaces of the bearing assembly and the additional surface; and
distributing lubricant from one or more solid lubricant bodies of the bearing assembly on at least the superhard bearing surfaces, the one or more solid lubricant bodies being positioned near at least one of the superhard bearing surfaces.

* * * * *